United States Patent
Kawae et al.

(10) Patent No.: US 8,035,484 B2
(45) Date of Patent: Oct. 11, 2011

(54) SEMICONDUCTOR DEVICE AND IC LABEL, IC TAG, AND IC CARD PROVIDED WITH THE SEMICONDUCTOR DEVICE

(75) Inventors: Daisuke Kawae, Isehara (JP); Takayuki Ikeda, Atsugi (JP); Munehiro Kozuma, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 299 days.

(21) Appl. No.: 12/155,056

(22) Filed: May 29, 2008

(65) Prior Publication Data

US 2008/0297320 A1    Dec. 4, 2008

(30) Foreign Application Priority Data

May 31, 2007 (JP) ................ 2007-144372

(51) Int. Cl.
    *H04Q 5/22* (2006.01)
(52) U.S. Cl. ............. 340/10.1; 340/572.1; 340/539.1; 340/10.34; 455/269; 455/127.1; 455/343.1; 323/282; 323/284; 323/265
(58) Field of Classification Search .......... 455/269; 327/536, 537; 320/137–140, 162, 164, 166–167
    See application file for complete search history.

(56) References Cited

U.S. PATENT DOCUMENTS

| | | | |
|---|---|---|---|
| 5,291,388 A * | 3/1994 | Heinrich .............. | 363/98 |
| 5,608,614 A * | 3/1997 | Ohnishi et al. .......... | 363/60 |
| 5,721,517 A * | 2/1998 | Goma et al. .......... | 331/117 R |
| 5,936,474 A | 8/1999 | Rousselin | |
| 5,953,642 A | 9/1999 | Feldtkeller et al. | |
| 6,025,794 A * | 2/2000 | Kusumoto et al. .......... | 341/172 |
| 6,057,611 A * | 5/2000 | Reiser ............. | 307/125 |
| 6,070,803 A | 6/2000 | Stobbe | |
| 6,147,605 A * | 11/2000 | Vega et al. .......... | 340/572.7 |
| 6,229,443 B1 * | 5/2001 | Roesner .......... | 340/572.1 |
| 6,320,770 B1 * | 11/2001 | Feuser .......... | 363/59 |
| 6,321,067 B1 | 11/2001 | Suga et al. | |
| 6,343,022 B1 | 1/2002 | Naruse | |
| 6,373,225 B1 * | 4/2002 | Haraguchi et al. .......... | 320/122 |
| 6,427,065 B1 * | 7/2002 | Suga et al. .......... | 455/41.1 |
| 6,486,729 B2 * | 11/2002 | Imamiya .......... | 327/536 |
| 6,509,217 B1 * | 1/2003 | Reddy .......... | 438/153 |
| 6,549,064 B2 * | 4/2003 | Bandy et al. .......... | 327/536 |

(Continued)

FOREIGN PATENT DOCUMENTS

DE          43 27 642       11/1994

(Continued)

OTHER PUBLICATIONS

Wikipedia, Feb. 6, 2006, Diode.*

(Continued)

*Primary Examiner* — Benjamin C Lee
*Assistant Examiner* — Quang D Pham
(74) *Attorney, Agent, or Firm* — Eric J. Robinson; Robinson Intellectual Property Law Office, P.C.

(57) ABSTRACT

A charge accumulation circuit having a structure in which a capacitor is divided into a plurality of pieces and the divided capacitors are connected in parallel through switches is provided. The charge accumulation circuit controls the switch provided between the capacitors and thus can dynamically vary electrostatic capacitance of the charge accumulation circuit which applies a voltage to a constant voltage circuit.

20 Claims, 19 Drawing Sheets

U.S. PATENT DOCUMENTS

| | | | |
|---|---|---|---|
| 6,570,490 B1 * | 5/2003 | Saitoh et al. | 340/10.1 |
| 6,615,074 B2 | 9/2003 | Mickle et al. | |
| 6,642,775 B2 * | 11/2003 | Imamiya | 327/536 |
| 6,646,415 B1 * | 11/2003 | Nebrigic et al. | 320/107 |
| 6,718,250 B2 * | 4/2004 | Rueger et al. | 701/103 |
| 6,774,609 B2 * | 8/2004 | Heftman | 323/222 |
| 6,809,498 B2 * | 10/2004 | Nakamura et al. | 320/108 |
| 6,826,504 B2 * | 11/2004 | Rueger et al. | 702/107 |
| 6,837,438 B1 * | 1/2005 | Takasugi et al. | 235/492 |
| 6,850,039 B2 * | 2/2005 | Popescu | 320/134 |
| 6,963,269 B2 * | 11/2005 | Saitoh et al. | 340/10.1 |
| 7,135,835 B2 * | 11/2006 | Yamada et al. | 318/800 |
| 7,279,957 B2 * | 10/2007 | Yen | 327/536 |
| 7,365,952 B2 * | 4/2008 | Sato | 361/90 |
| 7,564,704 B2 * | 7/2009 | Rozsypal et al. | 363/56.1 |
| 7,595,732 B2 * | 9/2009 | Shameli et al. | 340/572.5 |
| 7,642,918 B2 * | 1/2010 | Kippelen et al. | 340/572.8 |
| 7,667,310 B2 * | 2/2010 | Dozen et al. | 257/678 |
| 7,710,270 B2 * | 5/2010 | Shionoiri et al. | 340/572.1 |
| 2002/0008632 A1 * | 1/2002 | Clothier | 340/825.37 |
| 2002/0149416 A1 * | 10/2002 | Bandy et al. | 327/536 |
| 2003/0001833 A1 | 1/2003 | Hunter | |
| 2003/0057279 A1 | 3/2003 | Uozumi et al. | |
| 2003/0118190 A1 | 6/2003 | Sedlak et al. | |
| 2003/0178483 A1 | 9/2003 | Wakabayashi | |
| 2003/0183699 A1 | 10/2003 | Masui | |
| 2004/0109274 A1 * | 6/2004 | Sato | 361/90 |
| 2004/0217737 A1 * | 11/2004 | Popescu | 320/128 |
| 2005/0134435 A1 | 6/2005 | Koyama et al. | |
| 2005/0254183 A1 * | 11/2005 | Ishida et al. | 361/18 |
| 2006/0197668 A1 * | 9/2006 | Oliver et al. | 340/572.4 |
| 2006/0209060 A1 | 9/2006 | Tanada et al. | |
| 2006/0267771 A1 | 11/2006 | Shionoiri et al. | |
| 2007/0091655 A1 * | 4/2007 | Oyama et al. | 363/59 |
| 2007/0125172 A1 * | 6/2007 | Vanderzee | 73/304 C |
| 2007/0139198 A1 * | 6/2007 | Shim et al. | 340/572.1 |
| 2007/0229228 A1 * | 10/2007 | Yamazaki et al. | 340/10.34 |
| 2007/0229281 A1 * | 10/2007 | Shionoiri et al. | 340/572.7 |
| 2008/0212346 A1 * | 9/2008 | Rizzo et al. | 363/60 |
| 2009/0057418 A1 * | 3/2009 | Kozuma et al. | 235/492 |
| 2009/0237036 A1 * | 9/2009 | Ikeda et al. | 320/166 |
| 2010/0079203 A1 * | 4/2010 | Furutani | 327/564 |
| 2010/0079921 A1 * | 4/2010 | Fujita | 361/56 |

FOREIGN PATENT DOCUMENTS

| | | |
|---|---|---|
| DE | 44 38 287 | 5/1996 |
| DE | 198 28 936 | 12/1999 |
| FR | 2 757 952 | 7/1998 |
| JP | 07-212969 | 8/1995 |
| JP | 2001-057773 | 2/2001 |
| JP | 2005-259222 | 9/2005 |

OTHER PUBLICATIONS

Office Action (Application No. 08009822.1) dated Oct. 29, 2009.

Lee et al., *9.4 A CPU on a Glass Substrate Using CG-Silicon TFTs*, 2003 IEEE International Solid-State Circuits Conference Digest of Technical Papers, Feb. 2003, pp. 164-165.

Kurokawa et al., *32.4 UHF RFCPUs on Flexible and Glass Substrates for Secure RFID Systems*, 2007 IEEE International Solid-State Circuits Conference Digest of Technical Papers, Feb. 2007, pp. 574-575.

Barnett et al., *32.8 A Passive UHF RFID Transponder for EPC Gen 2 with −14dBm Sensitivity in 0.13μm CMOS*, 2007 IEEE International Solid-State Circuits Conference Digest of Technical Papers, Feb. 2007, pp. 582-583.

Ikeda et al., *21.2: Full-Functional System Liquid Crystal Display Using CG-Silicon Technology*, 2004 SID International Symposium Digest of Technical Papers, vol. 35, Book 2, May 2004, pp. 860-863.

Takayama et al., *A CPU on a Plastic Film Substrate*, 2004 Symposium on VLSI Technology Digest of Technical Papers, Jun. 2004, pp. 230-231.

Dembo et al, *RFCPUs on Glass and Plastic Substrates Fabricated by TFT Transfer Technology*, IEDM Technical Digest, IEEE International Electron Devices Meeting 2005, Dec. 2005, pp. 1067-1069.

Search Report (Application No. 08009822.1) dated Feb. 19, 2009.

Barnett et al., *32.8 A Passive UHF RFID Transponder for EPC Gen 2 with −14dBm Sensitivity in 0.13μm CMOS*, 2007 IEEE International Solid-State Circuits Conference Digest of Technical Papers, Feb. 2007, pp. 582-583, 623.

* cited by examiner

100: semiconductor device;
101: antenna;
102: rectifier circuit;
103: charge accumulation circuit;
104: constant voltage circuit;
105: logic circuit.

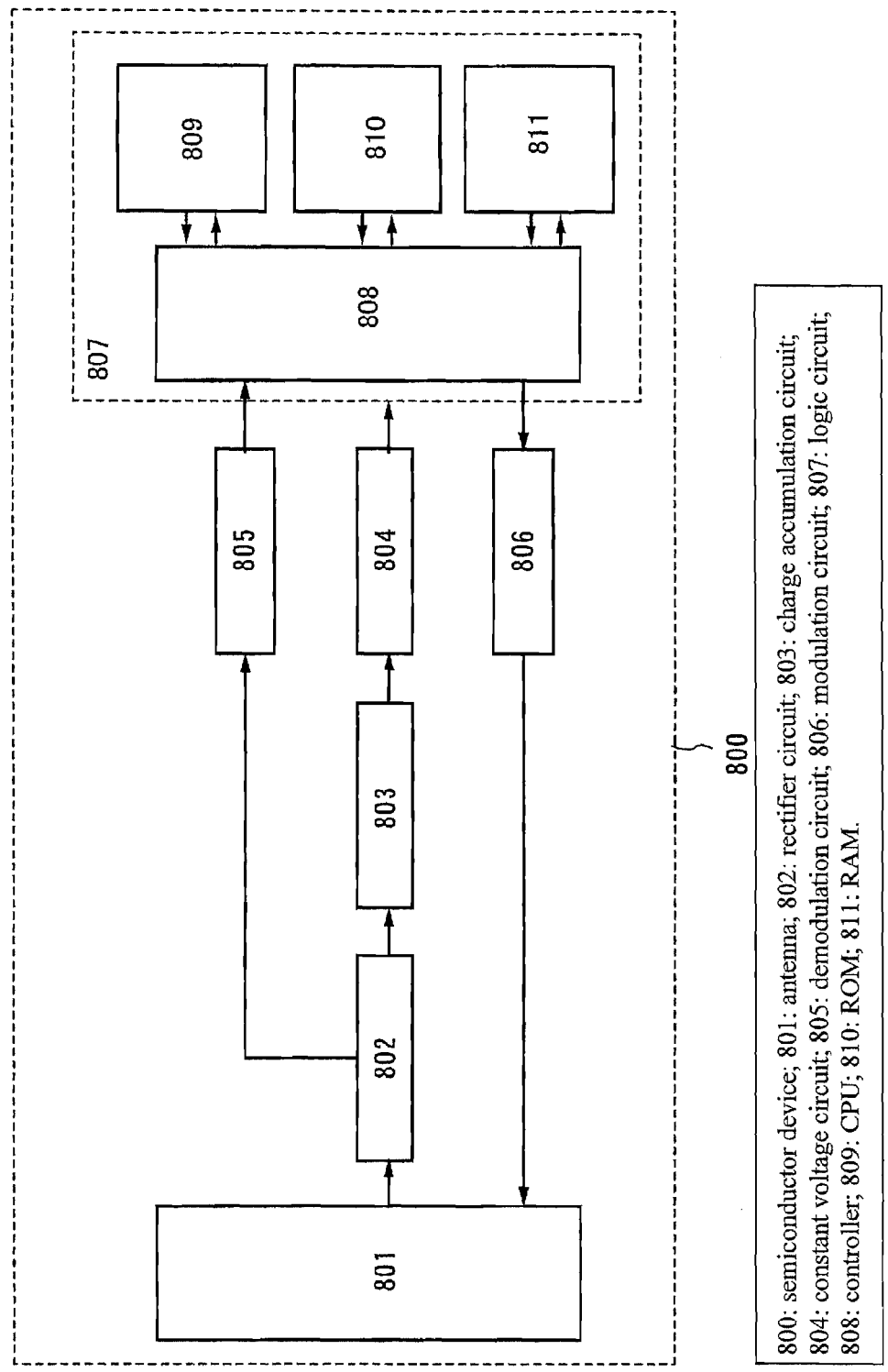

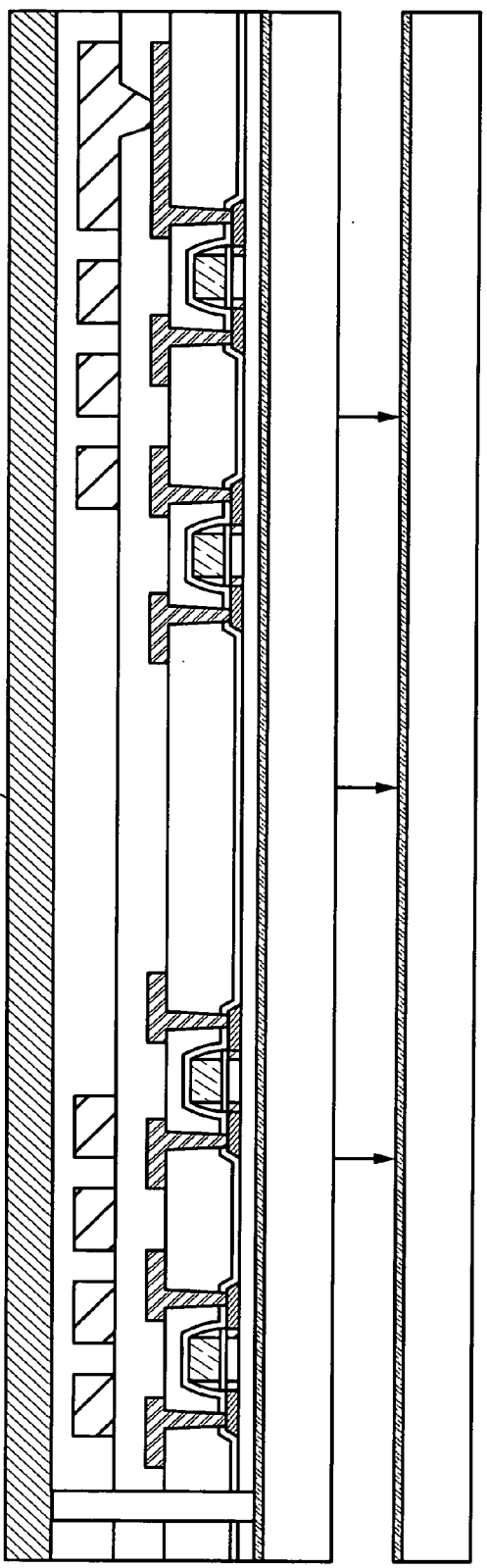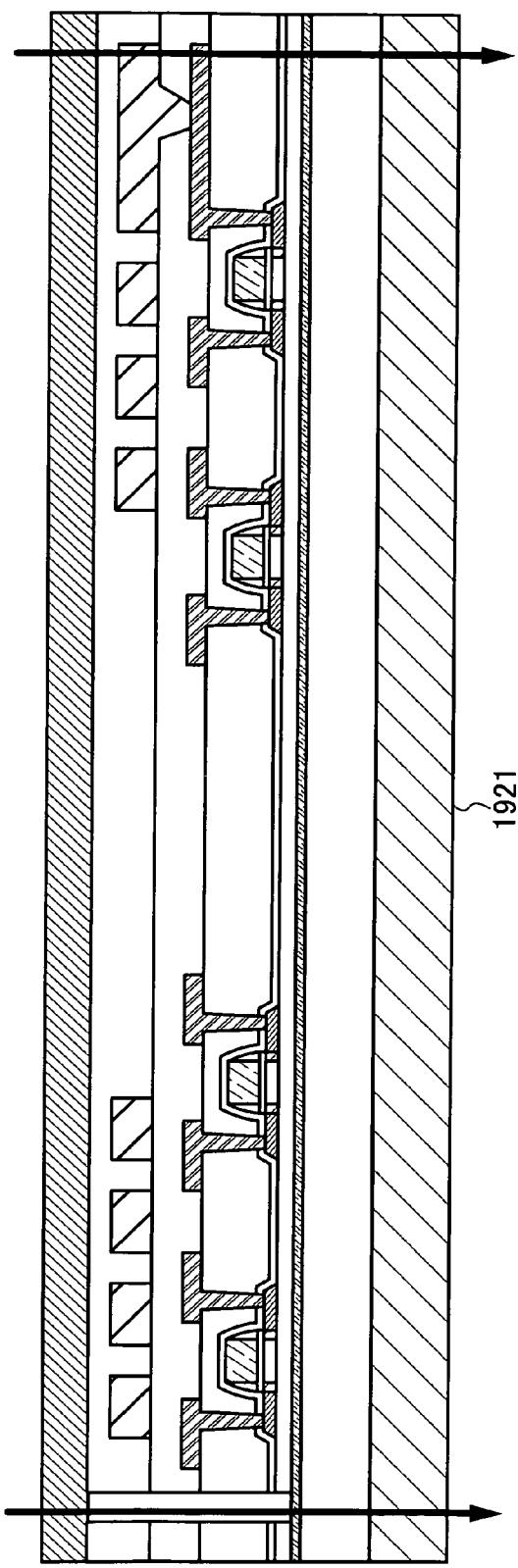
FIG. 12A
FIG. 12B

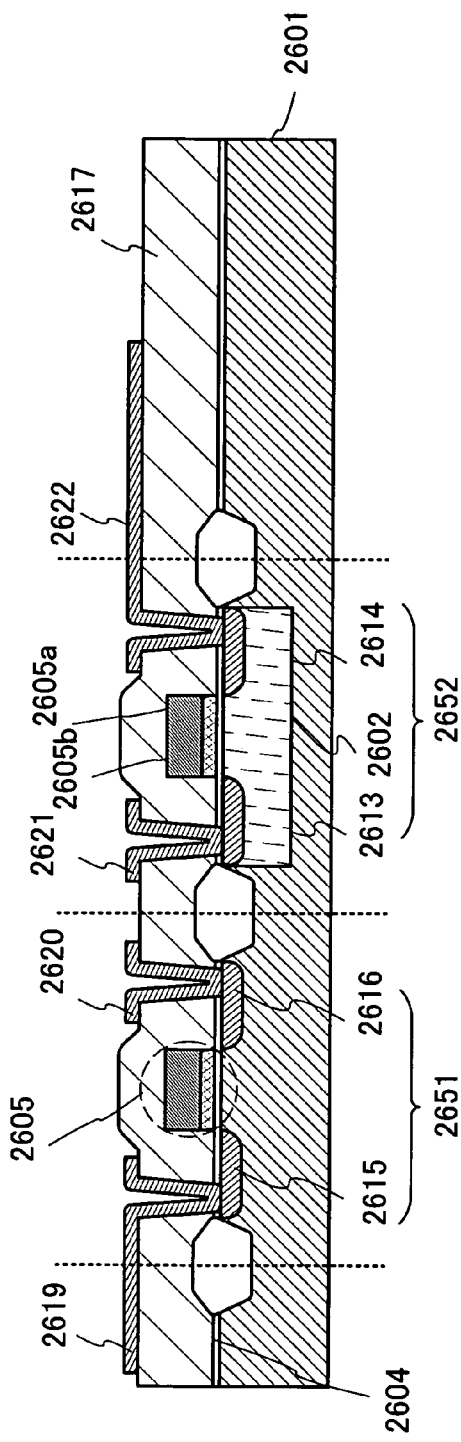
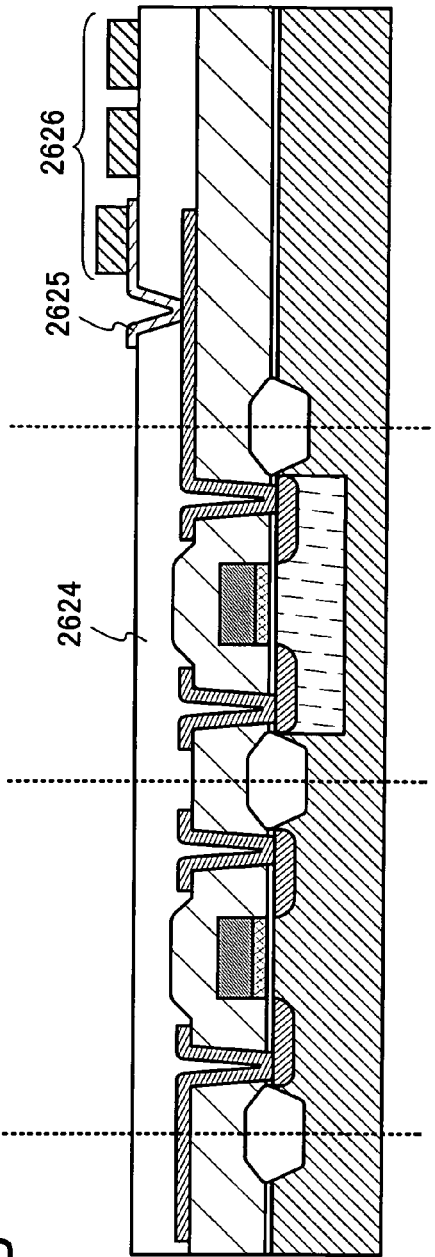
FIG. 16A
FIG. 16B

SEMICONDUCTOR DEVICE AND IC LABEL, IC TAG, AND IC CARD PROVIDED WITH THE SEMICONDUCTOR DEVICE

BACKGROUND OF THE INVENTION

1. Field of the Invention

The present invention relates to a semiconductor device. The present invention particularly relates to a semiconductor device capable of wirelessly communicating data, a so-called IC chip (also referred to as an ID chip or a transponder) for RFID (radio frequency identification).

Note that a semiconductor device described in this description refers to a general device capable of functioning by utilizing semiconductor characteristics.

2. Description of the Related Art

In recent years, it is called ubiquitous information society that an environment in which it is possible to access an information network anytime and anywhere has been put into place. In such environment, an individual identification technique in which an ID (individual identification number) is given to an individual object to clarify records of the object so that it is useful for production, management, and the like has been researched for practical use. Among them, a semiconductor device (hereinafter referred to as a semiconductor device, and also referred to as an ID chip, an IC chip, or a transponder) using an RFID (radio frequency identification) technique, which wirelessly communicates data with an external communication device (hereinafter referred to as a communication device, and also referred to as a reader/writer, a controller, or an interrogator) has begun to be widely used.

A semiconductor device receives a wireless signal transmitted from a communication device with an antenna. Being an AC voltage signal (hereinafter referred to as an AC signal), the wireless signal is converted into a DC voltage signal (hereinafter referred to as a DC signal) by a rectifier circuit for rectification. The DC signal is inputted to a constant voltage circuit (also referred to as a regulator or a power supply circuit) so that a power supply voltage $V_{dd}$ is generated. The power supply voltage $V_{dd}$ generated in the constant voltage circuit is applied to a plurality of circuits included in the semiconductor device.

In the semiconductor device, it is important to supply a stable voltage to the constant voltage circuit for stable operation of the semiconductor device. As an example, Non-Patent Document 1 discloses a structure in which a capacitor is provided for applying a stable voltage to the constant voltage circuit (Non-Patent Document 1: Ray Barnett, Ganesh Balachandran, Steve Lazar, Brad Kramer, George Konnail, Suribhotla Rajasekhar, two Vladimir Drobny, "A Passive UHF RFID Transponder for EPC Gen 2 with −14 dBm Sensitivity in 0.13 μm CMOS" ISSCC, 32 8, PP582-583, pp 623, 2007).

[Non-Patent Document 1] Ray Barnett, Ganesh Balachandran, Steve Lazar, Brad Kramer, George Konnail, Suribhotla Rajasekhar, Vladimir Drobny, "A Passive UHF RFID Transponder for EPC Gen 2 with −14 dBm Sensitivity in 0.13 μm CMOS" ISSCC, 32 8, PP 582-583, pp 623, 2007

SUMMARY OF THE INVENTION

A capacitor for applying a stable voltage to a constant voltage circuit, which is illustrated in Non-Patent Document 1, can stabilize a voltage to be applied to the constant voltage circuit of the next stage by having higher electrostatic capacitance. However, with high electrostatic capacitance of the capacitor, there is a problem in that it takes long to obtain a desired voltage by the time for accumulating charges in the capacitor. Meanwhile, with low electrostatic capacitance of the capacitor, while a desired voltage can be obtained, there is a problem in that it becomes difficult to accumulate inputted charges and to apply a stable voltage to the constant voltage circuit of the next stage.

In view of the aforementioned problems, an object of the present invention is to provide a semiconductor device capable of generating a desired voltage in a short time and applying a stable voltage to a constant voltage circuit.

To achieve the above object, the semiconductor device of the present invention is provided with a charge accumulation circuit having a structure in which a capacitor is divided into a plurality of pieces and the divided capacitors are connected in parallel through switches. Further, the charge accumulation circuit in the semiconductor device of the present invention controls the switches provided between the capacitors and thus can dynamically vary electrostatic capacitance of the charge accumulation circuit which applies a voltage to a constant voltage circuit.

One mode of the present invention is a semiconductor device including an antenna; a rectifier circuit electrically connected to the antenna; a charge accumulation circuit electrically connected to the rectifier circuit; and a constant voltage circuit electrically connected to the charge accumulation circuit, wherein the charge accumulation circuit includes a plurality of switches and a plurality of capacitors, and the plurality of capacitors are electrically connected in parallel through the switches.

Another mode of the present invention is a semiconductor device including an antenna; a rectifier circuit electrically connected to the antenna; a charge accumulation circuit electrically connected to the rectifier circuit; and a constant voltage circuit electrically connected to the charge accumulation circuit, wherein the charge accumulation circuit includes a plurality of switches and a plurality of capacitors, and one electrodes of the plurality of capacitors are electrically connected through the switches.

Another mode of the present invention is a semiconductor device including an antenna; a rectifier circuit electrically connected to the antenna; a charge accumulation circuit electrically connected to the rectifier circuit; and a constant voltage circuit electrically connected to the charge accumulation circuit, wherein the charge accumulation circuit includes a plurality of switches, a plurality of capacitors, and a charge accumulation control circuit; the plurality of capacitors are electrically connected in parallel through the switches; and the charge accumulation control circuit controls on or off of the switches depending on a voltage to be applied to the constant voltage circuit.

Another mode of the present invention is a semiconductor device including an antenna; a rectifier circuit electrically connected to the antenna; a charge accumulation circuit electrically connected to the rectifier circuit; and a constant voltage circuit electrically connected to the charge accumulation circuit, wherein the charge accumulation circuit includes a plurality of switches and a plurality of capacitors, one electrodes of the plurality of capacitors are electrically connected through the switches, and the charge accumulation control circuit controls on or off of the switches depending on a voltage to be applied to the constant voltage circuit.

The semiconductor device of the present invention includes a charge accumulation circuit which controls the switches between the capacitors provided separately. Thus, since the semiconductor device of the present invention can control the switch so that electrostatic capacitance of the charge accumulation circuit is small in an initial state in which energy is not accumulated, a desired voltage can be generated in a short period. Since the semiconductor device of the present invention can control the switches so that electrostatic capacitance of the charge accumulation circuit is large after the desired power supply voltage is obtained, inputted charges can be efficiently accumulated and a stable voltage can be applied to the constant voltage circuit.

BRIEF DESCRIPTION OF THE DRAWINGS

In the accompanying drawings:
FIG. 8 is a diagram illustrating Embodiment Mode 2;
FIGS. 12A and 12B are views illustrating Embodiment Mode 3;
FIGS. 16A and 16B are views illustrating Embodiment Mode 5.

DETAILED DESCRIPTION OF THE INVENTION

Hereinafter, embodiment modes of the present invention will be described with reference to the accompanying drawings. However, the present invention can be carried out in many different modes, and it will be easily understood by those skilled in the art that various changes and modifications can be made to the modes and their details without departing from the spirit and scope of the present invention. Therefore, the present invention should not be construed as being limited to the description in the following embodiment modes.

Embodiment Mode 1

The structure of a semiconductor device of the present invention is described with reference to a block diagram shown in FIG. 1. Note that in this embodiment mode, the case is described in which the semiconductor device of the present invention is used as a semiconductor device capable of wirelessly communicating data, a so-called IC chip (also referred to as an ID chip, an IC chip, or a transponder) for RFID (radio frequency identification).

Figure 1:
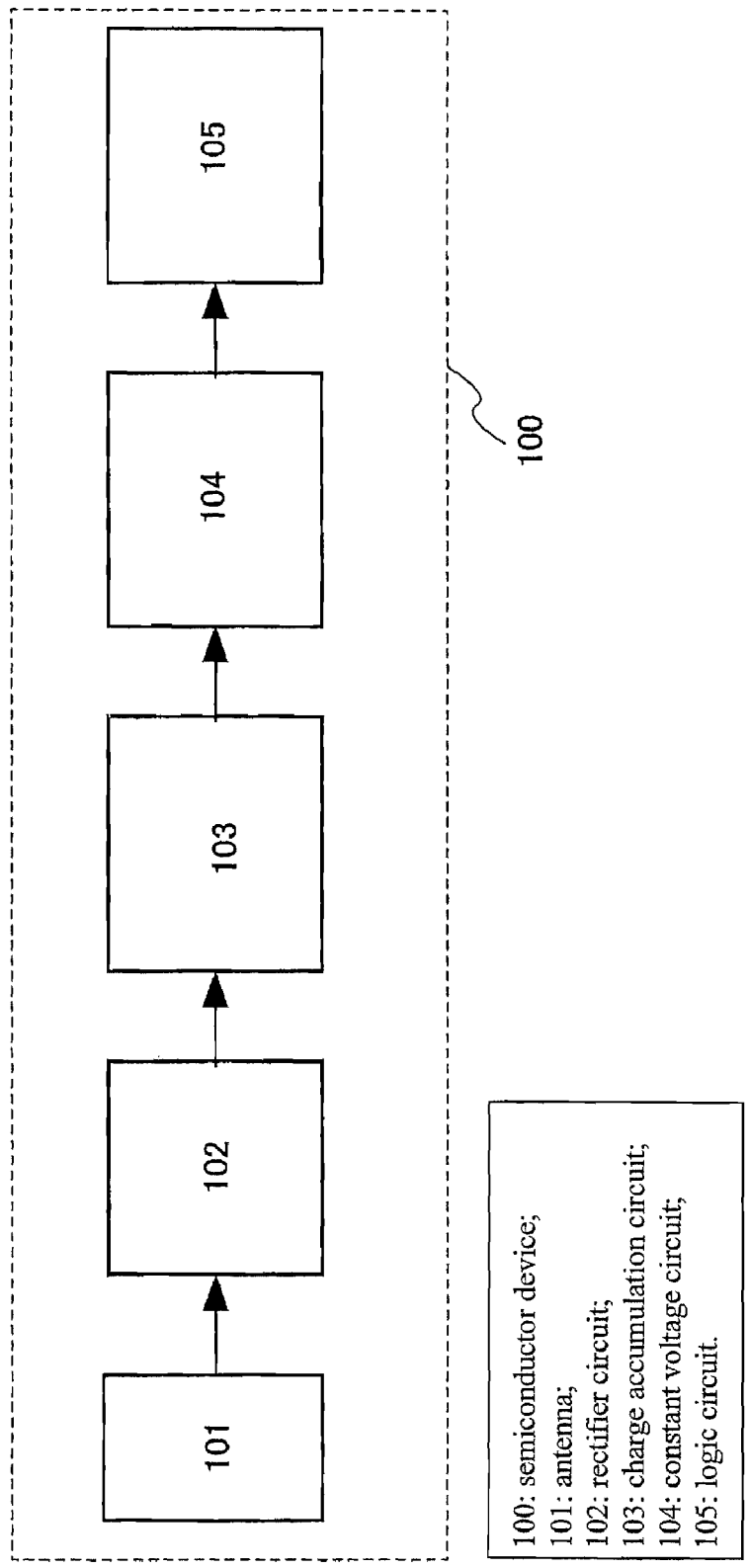
FIG. 1 is a diagram illustrating Embodiment Mode 1.

A semiconductor device 100 in FIG. 1 includes an antenna 101, a rectifier circuit 102, a charge accumulation circuit 103, a constant voltage circuit 104, and a logic circuit 105.

Note that although not shown here, the antenna 101 in FIG. 1 receives a signal from an external communication device (hereinafter referred to as a communication device, and also referred to as a reader/writer, a controller, or an interrogator) and transmits a signal to the communication device.

Note that the shape of the antenna 101 is not particularly limited in FIG. 1. That is, an electromagnetic coupling method, an electromagnetic induction method, a microwave method, or the like can be used as a signal transmission method which is employed for the antenna 101 of the semiconductor device 100. A practitioner may select a transmission method as appropriate in consideration of application, and an antenna with optimal length and shape may be provided in accordance with the transmission method.

In the case of employing, for example, an electromagnetic coupling method or an electromagnetic induction method (for example, a 13.56 MHz band) as the transmission method, electromagnetic induction caused by a change in electric field density is used. Therefore, a conductive film serving as an antenna is formed to have an annular shape (for example, a loop antenna) or a spiral shape (for example, a spiral antenna).

In the case of employing, for example, a microwave method (for example, a UHF band (860 to 960 MHz band) or a 2.45 GHz band) as the transmission method, the length or the shape of the conductive film serving as the antenna may be appropriately set in consideration of a wavelength of a radio wave used for signal transmission. For example, the conductive film serving as the antenna can be formed in a linear shape (for example, a dipole antenna), a flat shape (for example, a patch antenna), or the like. The shape of the conductive film serving as the antenna is not limited to a linear shape, and the conductive film serving as the antenna may be provided in a curved-line shape, a meandering shape, or a combination thereof, in consideration of a wavelength of an electromagnetic wave.

Note that the semiconductor device and the communication device communicate by one-way communication or two-way communication, employing any one of a space division multiplex method, a polarization division multiplex method, a frequency division multiplex method, a time division multiplex method, a code division multiplex method, or an orthogonal frequency division multiplex method.

For a frequency of a carrier wave of the semiconductor device and the communication device, any of the following may be employed: higher than or equal to 300 GHz and lower than 3 THz, which is the frequency of a submillimeter wave; higher than or equal to 30 GHz and lower than 300 GHz, which is the frequency of a millimeter wave; higher than or equal to 3 GHz and lower than 30 GHz, which is the frequency of a microwave; higher than or equal to 300 MHz and lower than 3 GHz, which is the frequency of an ultrahigh frequency wave; higher than or equal to 30 MHz and lower than 300 MHz, which is the frequency of a very high frequency wave; higher than or equal to 3 MHz and lower than 30 MHz, which is the frequency of a short wave; higher than or equal to 300 kHz and lower than 3 MHz, which is the frequency of a medium wave; higher than or equal to 30 kHz and lower than 300 kHz, which is the frequency of a long wave; and higher than or equal to 3 kHz and lower than 30 kHz, which is the frequency of a very low frequency wave. A carrier wave of the semiconductor device and the communication device may be modulated by either analog modulation or digital modulation, and any one of amplitude modulation, phase modulation, frequency modulation, or spread spectrum modulation may be employed. Amplitude modulation or frequency modulation is desirably employed.

Figure 2A:
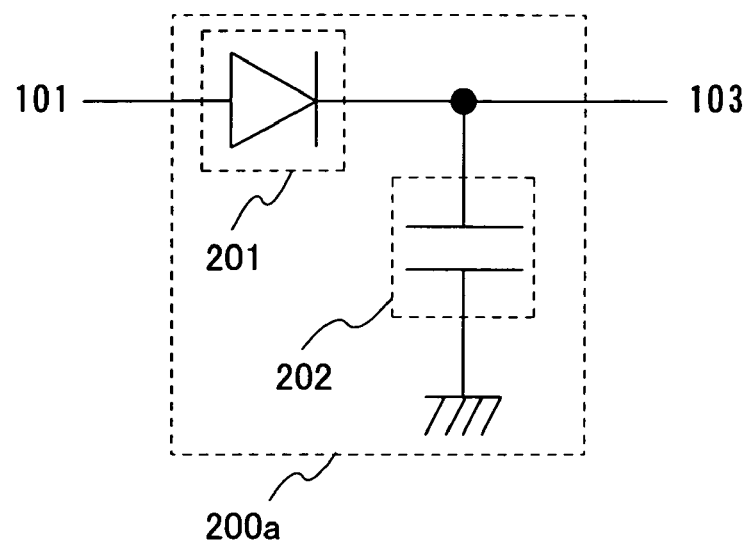
FIGS. 2A and 2B are diagrams each illustrating Embodiment Mode 1.
Figure 2B:
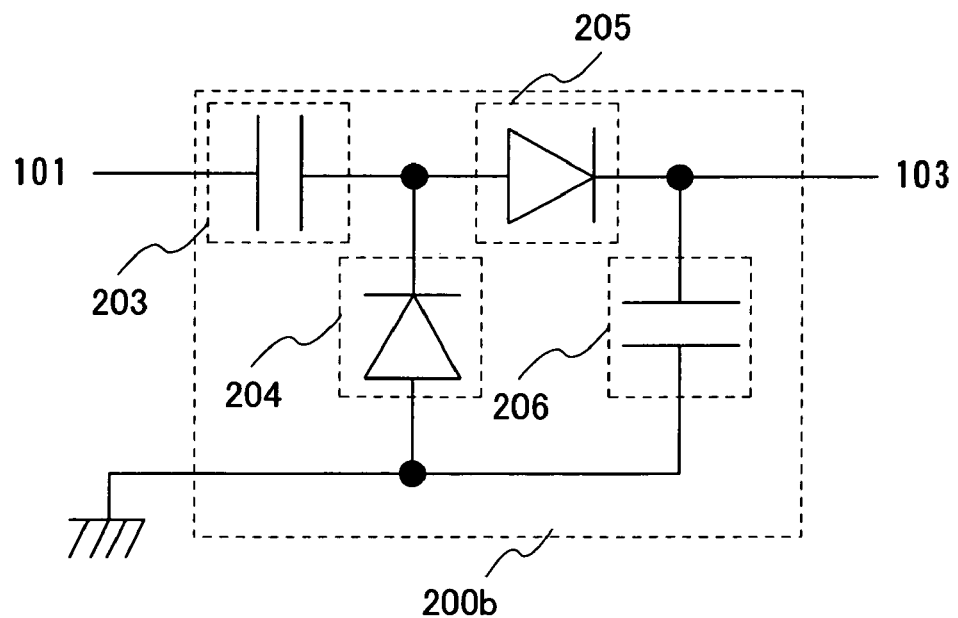

Next, FIGS. 2A and 2B show structural examples of the rectifier circuit 102 shown in FIG. 1. The rectifier circuit 102 is allowable as long as it converts an AC signal generated by a radio wave received by the antenna 101 into a DC signal. For example, the rectifier circuit 102 may be a rectifier circuit 200a including a diode 201 and a capacitor 202 as shown in FIG. 2A.

Note that the rectifier circuit 102 shown in FIG. 1 may have a circuit configuration called a half-wave voltage doubler rectifier circuit. For example, the rectifier circuit 200b may be a half-wave voltage doubler rectifier circuit including a capacitor 203, a diode 204, a diode 205, and a capacitor 206 as shown in FIG. 2B. The present invention is not limited to this and a half-wave voltage quadrupler rectifier circuit, a half-wave voltage sextupler rectifier circuit, an all-wave rectifier circuit, or the like may be alternatively used.

Note that the capacitors shown in FIGS. 2A and 2B each have an electrical connection using two terminals. In that case, one electrode of each of the capacitors is called a first electrode and the other electrode is called a second electrode. Further, the diodes shown in FIGS. 2A and 2B each have an electrical connection using two terminals. In that case, an anode of each of the diodes is called a first electrode and a cathode of each of the diodes is called a second electrode.

Figure 19:
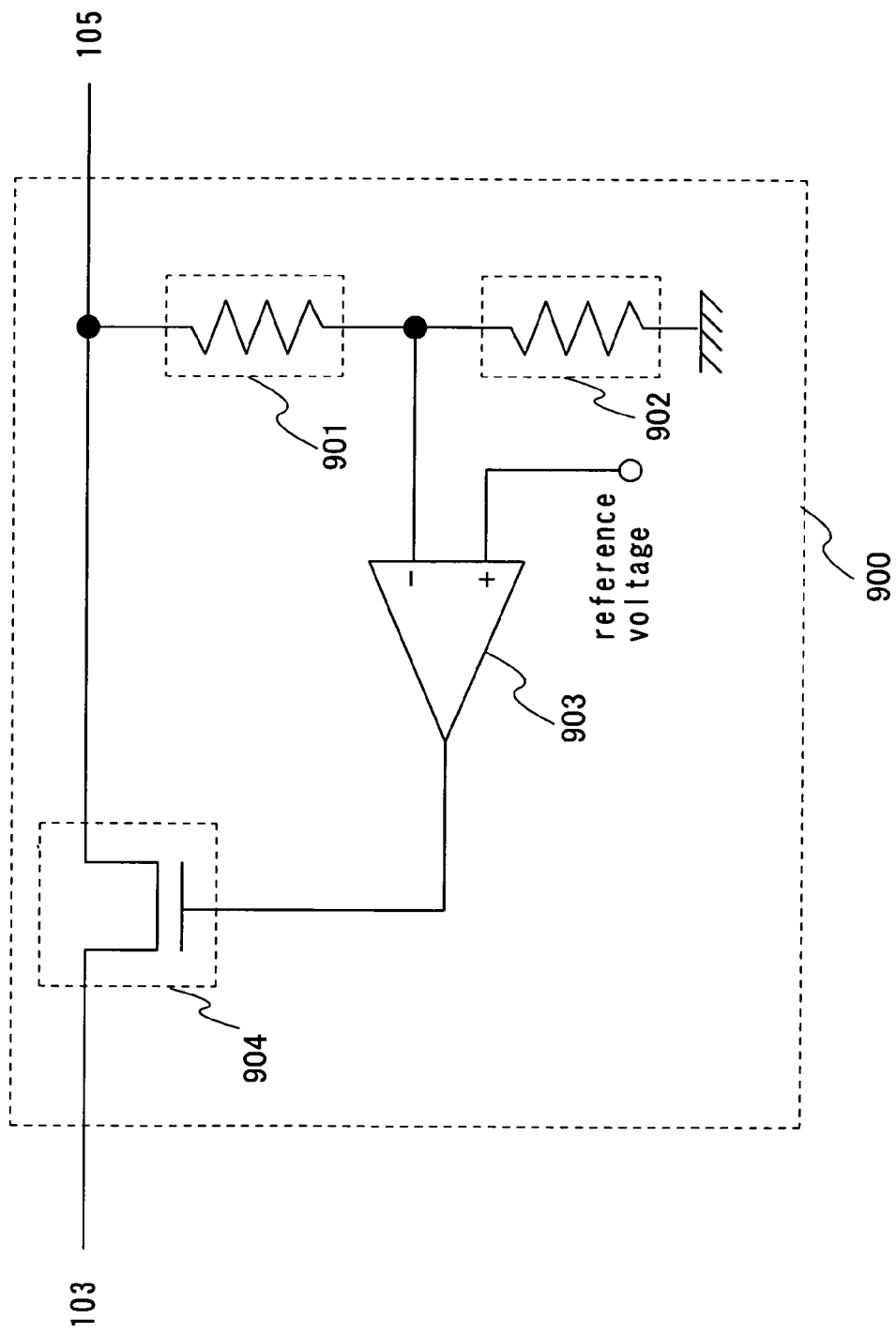
FIG. 19 is a diagram illustrating Embodiment Mode 1.

Next, FIG. 19 shows a structural example of the constant voltage circuit 104 shown in FIG. 1. The constant voltage circuit 104 shown in FIG. 19 includes a first resistor 901, a second resistor 902, a comparator 903, and a transistor 904. The comparator 903 has a function of comparing a reference voltage inputted to a non-inverting input terminal and a voltage of a node connected to the logic circuit 105, which is divided by the first resistor 901 and the second resistor 902. An output terminal of the comparator 903 is connected to a gate terminal of the transistor 904. Further, the comparator 903 achieves a function of outputting a constant voltage through the transistor 904.

Next, the structure of the charge accumulation circuit 103 included in the semiconductor device shown in FIG. 1, which is a feature of the present invention, is described in detail. The charge accumulation circuit 103 includes a plurality of capacitors and a plurality of switches, where the capacitors arranged in parallel are electrically connected through the switches. The charge accumulation circuit 103 sequentially accumulates charges of a DC signal outputted from the rectifier circuit 102 in the plurality of capacitors by switching between on and off of the switches to boost a voltage to a desired voltage in a short period and thus outputs a stable voltage to the constant voltage circuit 104.

Figure 3:
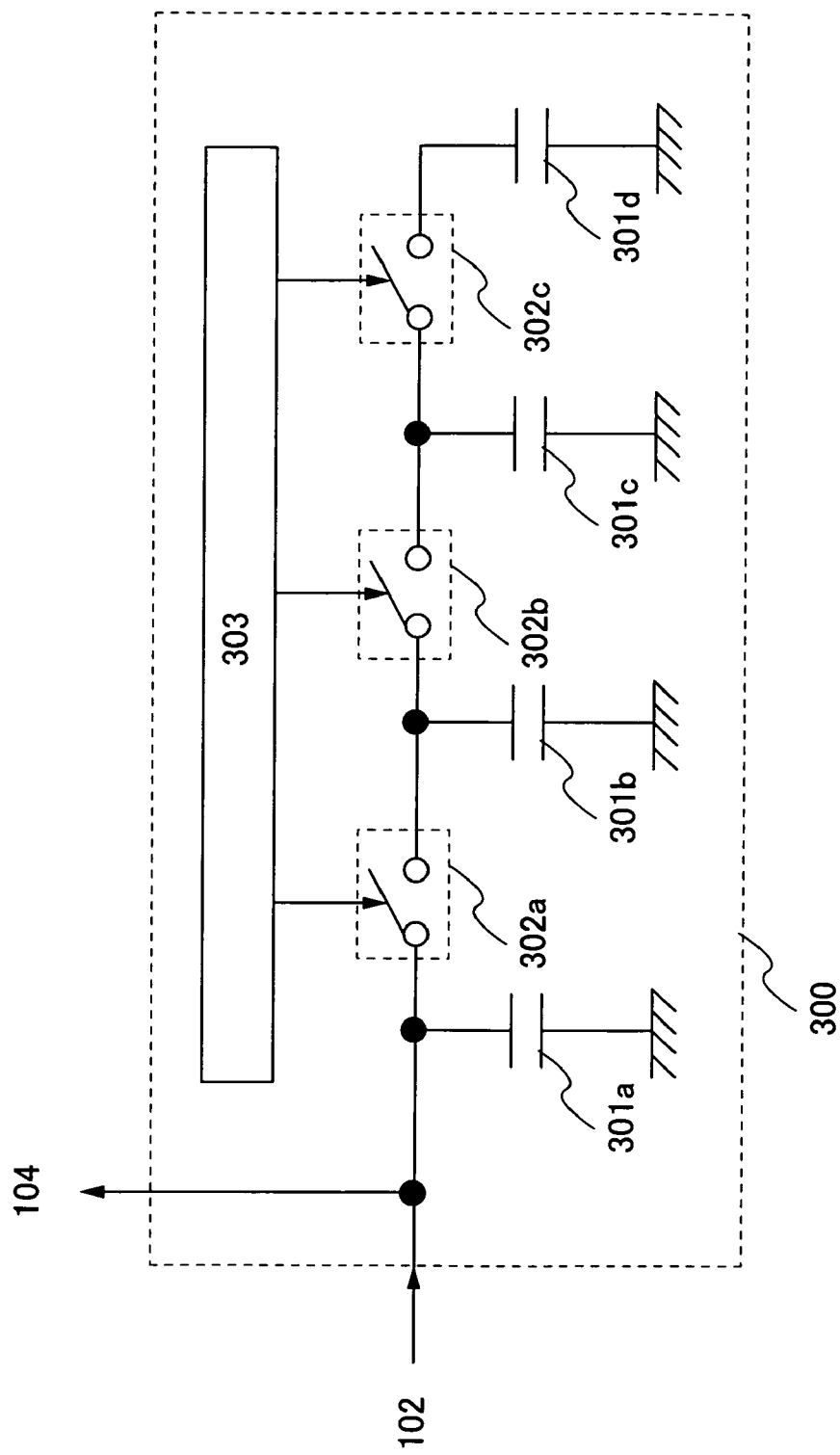
FIG. 3 is a diagram illustrating Embodiment Mode 1.

The specific configuration of the charge accumulation circuit 103 is shown in FIG. 3 and described. A charge accumulation circuit 300 shown in FIG. 3 includes a first capacitor 301a, a second capacitor 301b, a third capacitor 301c, a fourth capacitor 301d, a switch 302a, a switch 302b, a switch 302c, and a charge accumulation control circuit 303. In FIG. 3, the rectifier circuit 102 is electrically connected to a first electrode of the first capacitor 301a and one terminal of the switch 302a. The first electrode of the first capacitor 301a, a first electrode of the second capacitor 301b, a first electrode of the third capacitor 301c, and a first electrode of the fourth capacitor 301d are connected in parallel through the switch 302a, the switch 302b, and the switch 302c. Further, a second electrode of the first capacitor 301a, a second electrode of the second capacitor 301b, a second electrode of the third capacitor 301c, and a second electrode of the fourth capacitor 301d are connected to respective ground lines. Further, the switch 302a, the switch 302b, and the switch 302c are controlled to be turned on or off by the charge accumulation control circuit 303.

Note that FIG. 3 shows an example in which the charge accumulation circuit 300 includes four capacitors and three switches. Note that in the present invention, there is no limitation on the number of capacitors and switches. The structure described in this embodiment mode may be a structure in which a switch is provided between one electrodes of the capacitors connected in parallel. Note that although FIG. 3 shows an example in which one capacitor is connected to a node between the switches, a plurality of capacitors may be provided.

Next, the specific operation of the charge accumulation circuit 103 is described with reference to FIGS. 4A to 4C and 5A to 5C. Note that a charge accumulation circuit 400 shown in FIGS. 4A to 4C and 5A to 5C includes a first capacitor 401a, a second capacitor 401b, a third capacitor 401c, a switch 402a, and a switch 402b. Note that since FIGS. 4A to 4C and 5A to 5C illustrate on or off operation of each switch, the charge accumulation control circuit is not shown. Further, in FIGS. 4A to 4C and 5A to 5C, an example in which a charge of a DC signal inputted from the rectifier circuit 102 is Q and a voltage outputted to the constant voltage circuit 104 is gradually changed to V0, V1, and V2 is described. Note that a voltage outputted to the constant voltage circuit 104 satisfies V0<V1<V2. A DC signal is inputted to a first electrode of the first capacitor 401a and one terminal of the switch 402a. The first electrode of the first capacitor 401a, a first electrode of the second capacitor 401b, and a first electrode of the third capacitor 401c are connected in parallel through the switch 402a and the switch 402b. A second electrode of the first capacitor 401a, a second electrode of the second capacitor 401b, and a second electrode of the third capacitor 401c are connected to respective ground lines. The switch 402a and the switch 402b are controlled to be turned on or off by a charge accumulation control circuit (not shown). Note that reference numerals are used in FIG. 4A and omitted in FIGS. 4B and 4C and 5A to 5C. Electrostatic capacitance of the first capacitor 401a, electrostatic capacitance of the second capacitor 401b, and electrostatic capacitance of the third capacitor 401c, which are illustrated in FIGS. 4A to 4C and 5A to 5C, are C1, C2, and C3, respectively. Note that the electrostatic capacitance C1, the electrostatic capacitance C2, the electrostatic capacitance C3 may be the same or different.

A voltage outputted to the constant voltage circuit 104, which is described in this specification, corresponds to a potential difference in the case where a ground potential is a reference potential. Therefore, voltages V0 to V2 may be called potentials V0 to V2.

Figure 4A:
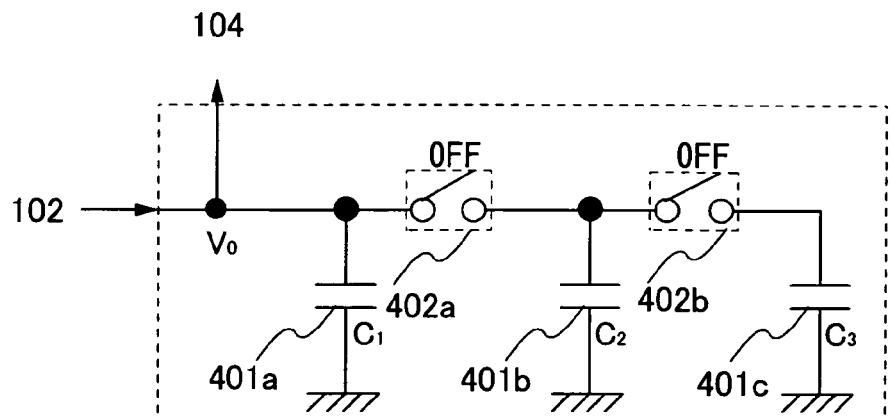
FIGS. 4A to 4C are diagrams each illustrating Embodiment Mode 1.

The state in FIG. 4A is described. The charge Q of the DC signal outputted from the rectifier circuit 102 is accumulated in the charge accumulation circuit 400. In the charge accumulation circuit 400, switches, that is, the switch 402a and the switch 402b are off in an initial state, and the charge Q is accumulated in the first capacitor 401a which is electrostatic capacitance C1. In that case, the charge Q is accumulated in the first capacitor 401a which is electrostatic capacitance C1 and thus, $Q/C1=V0$ (V0 is a desired voltage outputted to the constant voltage circuit 104) can be obtained from a relational expression of electrostatic capacitance C, a charge Q, and a voltage V: $Q=CV$. Note that the electrostatic capacitance C1 of the first capacitor 401a is desirably designed small so that the voltage V1 can be obtained in a short period by the charge Q to be accumulated.

Note that the charge Q in this specification refers to a charge supplied to the charge accumulation circuit 400 by a voltage of a DC signal obtained in the rectifier circuit 102. In the charge accumulation circuit 400, the smaller the value of electrostatic capacitance for charge accumulation is, in the shorter period a desired voltage can be obtained. Note that in this embodiment mode, for description, the charge Q supplied to the charge accumulation circuit 400 is a total of charges supplied in each period in which the state is changed from the state in FIG. 4B to the state in FIG. 4C.

Figure 4B:
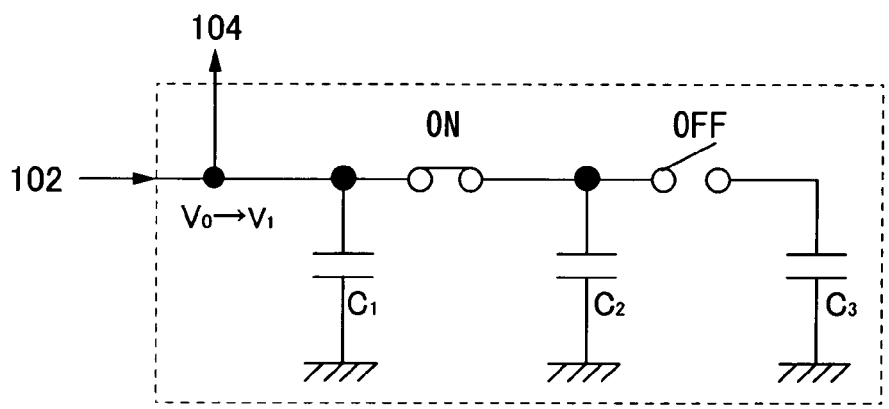

Next, the state in FIG. 4B is described. The charge Q of the DC signal outputted from the rectifier circuit 102 is supplied to the charge accumulation circuit 400 continuously from the state in FIG. 4A. In this case, the desired voltage V0 for being outputted to the constant voltage circuit 104 has already been obtained; however, in the first capacitor 401a for charge accumulation, a charge capable of being accumulated is saturated depending on the voltage of the DC signal outputted from the rectifier circuit 102. In this state, by turning the switch 402a on, the number of capacitors each capable of accumulating a charge is increased so that the first capacitor 401a and the second capacitor 401b can each accumulate a charge, and thus power received by the antenna 101 can be accumulated in the capacitors as a charge. In the state in FIG. 4B, electrostatic capacitance for charge accumulation is electrostatic capacitance (C1+C2) which is total capacitance of the first capacitor 401a and the second capacitor 401b. As for the charge Q, the total of the charge Q accumulated in the state in FIG. 4A and the charge Q sequentially inputted to the charge accumulation circuit 400 is 2Q. From the relational expression of electrostatic capacitance, a charge, and a voltage, 2Q/(C1+C2)=V1 can be obtained. Note that the electrostatic capacitance C2 is desirably smaller than the electrostatic capacitance C1. The electrostatic capacitance C2 is provided so as to be smaller than the electrostatic capacitance C1, so that a voltage fluctuation range when the switch 402b is turned on and thus the voltage is changed from V1 to V2 can be reduced, and a stable voltage can be applied to the constant voltage circuit 104.

Figure 4C:
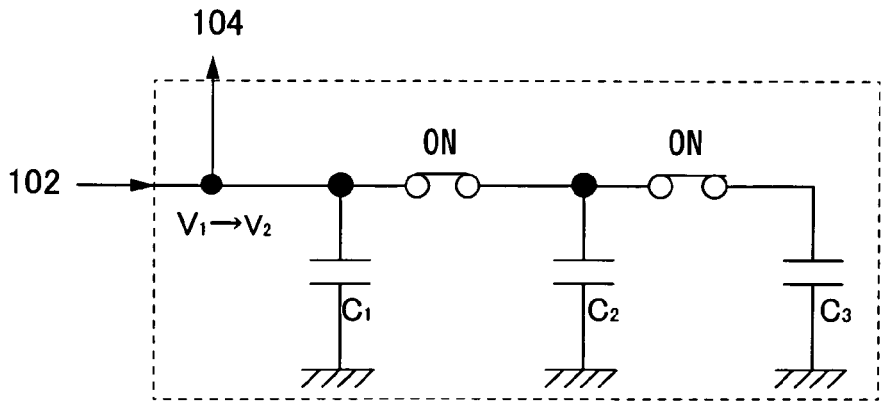

Next, the state in FIG. 4C is described. The charge Q of the DC signal outputted from the rectifier circuit 102 is supplied to the charge accumulation circuit 400 continuously from the state in FIGS. 4A and 4B. In this case, V0 for being outputted to the constant voltage circuit 104 has already been obtained; however, in the first capacitor 401a and the second capacitor 401b for charge accumulation, a charge capable of being accumulated is saturated depending on the voltage of the DC signal outputted from the rectifier circuit 102. In this state, by turning the switch 402b on together with the switch 402a, capacitors capable of accumulating a charge are increased so that the first capacitor 401a, the second capacitor 401b, and the third capacitor 401c can accumulate a charge, which makes it possible to accumulate power received by the antenna 101 as a charge in the capacitors. In the state in FIG. 4C, electrostatic capacitance for charge accumulation is electrostatic capacitance (C1+C2+C3) which is total capacitance of the first capacitor 401a, the second capacitor 401b, and the third capacitor 401c. As for the charge Q, the total of the charge 2Q accumulated in the state in FIG. 4B and the charge Q sequentially inputted to the charge accumulation circuit 400 is 3Q. From the relational expression of electrostatic capacitance, charge, and voltage, 3Q/(C1+C2+C3)=V2 can be obtained. Note that the electrostatic capacitance C3 is desirably lower than the electrostatic capacitance (C1+C2). The electrostatic capacitance C3 is provided so as to be lower than the electrostatic capacitance (C1+C2), so that a voltage fluctuation range when the switch 402a is turned on and thus the voltage is changed from V0 to V1 can be reduced, and a stable voltage can be applied to the constant voltage circuit 104.

As described above, FIGS. 4A to 4C show a method for accumulating charges of the charge accumulation circuit 400. The structures shown in FIGS. 4A to 4C are examples, and it is also allowed that electrostatic capacitance capable of accumulating charges is increased by increasing the number of capacitors and switches. The order of on and off of the switches is not limited to that shown in FIGS. 4A to 4C. For example, the switch 402a and the switch 402b may be simultaneously turned on to vary electrostatic capacitance for charge accumulation.

Next, operation regarding discharge of charges accumulated in the charge accumulation circuit 400 is described with reference to FIGS. 5A to 5C.

Figure 5A:
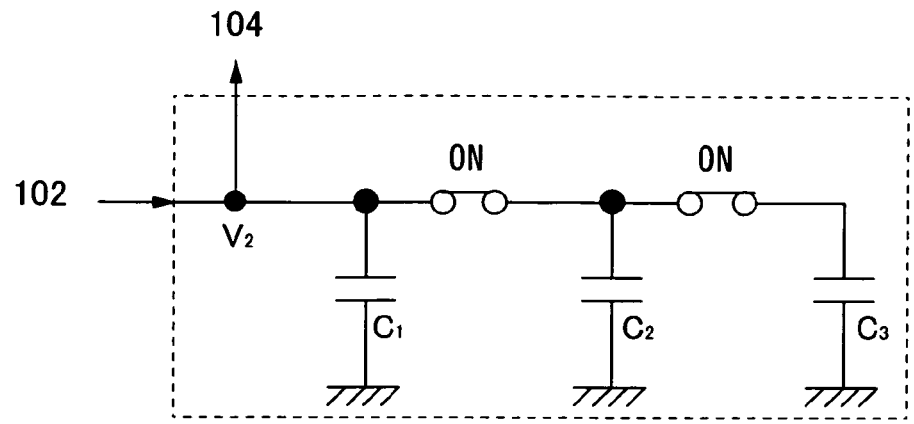
FIGS. 5A to 5C are diagrams each illustrating Embodiment Mode 1.
Figure 5B:
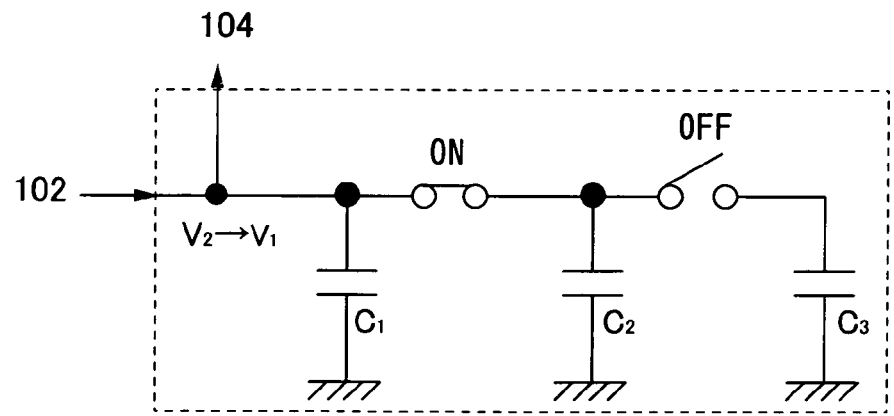
Figure 5C:
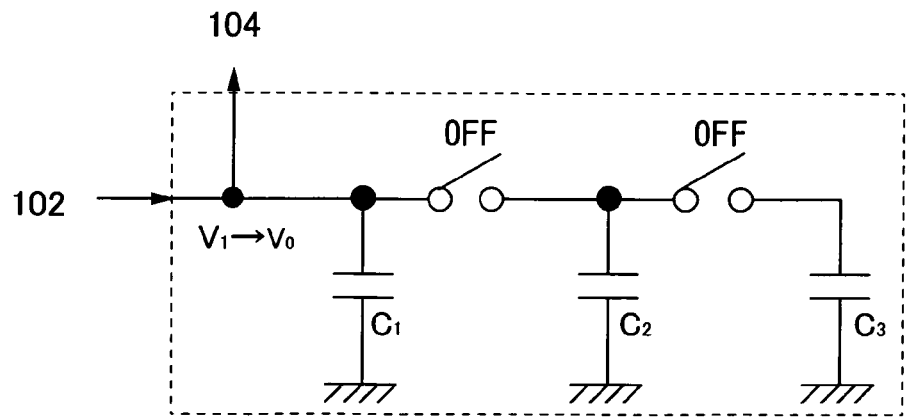

The state in FIG. 5A is described. The charge accumulation circuit 400 discharges charges stored in the plurality of capacitors in order to output a stable voltage to the constant voltage circuit 104 in a period in which charges are not supplied by the voltage of the DC signal outputted from the rectifier circuit 102. As for discharge of charges accumulated in the plurality of capacitors, the state is changed from FIG. 5A in which both the switch 402a and the switch 402b are on to FIG. 5C in which both the switch 402a and the switch 402b are off through FIG. 5B in which the switch 402a is on and the switch 402b is off. Thus, as illustrated in FIGS. 5A to 5C, the charge accumulation circuit 400 can discharge charges from the first capacitor, the second capacitor, and the third capacitor which are the plurality of capacitors.

Here, the specific structures of the switches 302a to 302c shown in FIG. 3 and the switches 402a and 402b shown in FIG. 4B and 4C and 5A to 5C are described with reference to FIG. 6. In order to additionally describe operation of the charge accumulation circuit when charges are accumulated and discharged, the structure of the switch 402a shown in FIGS. 4B and 4C and 5A to 5C is specifically illustrated in FIG. 6.

Figure 6:
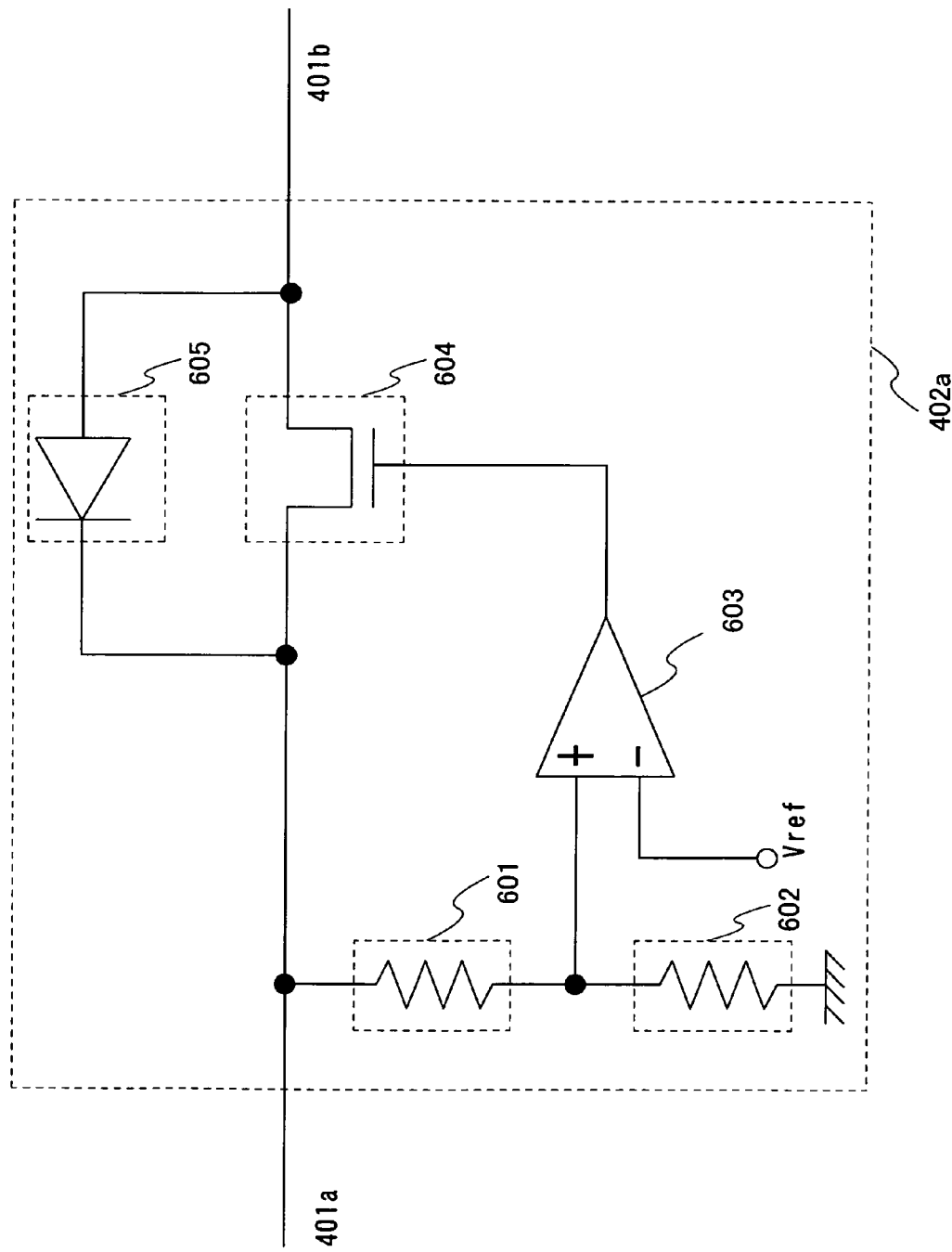
FIG. 6 is a diagram illustrating Embodiment Mode 1.

The switch 402a shown in FIG. 6 includes a first resistor 601, a second resistor 602, a comparator 603, a transistor 604, and a diode 605. The comparator 603 has a function of comparing a reference voltage (Vref in FIG. 6) from the charge accumulation circuit 303 described in FIG. 3, which is inputted to an inverting input terminal, and a voltage obtained by dividing a voltage of the first electrode of the first capacitor 401a by the first resistor 601 and the second resistor 602, which is inputted to a non-inverting input terminal. An output terminal of the comparator 603 is connected to a gate terminal of the transistor 604. The comparator 603 functions as a switch which turns the transistor 604 on to electrically connect the first electrode of the first capacitor 401a and the first electrode of the second capacitor 401b when the voltage of the first electrode of the first capacitor 401a is higher than V0. Therefore, the charge accumulation control circuit 303 illustrated in FIG. 3 controls the reference voltage, so that a switch for sequentially accumulating charges in the plurality of capacitors can be controlled to be turned on or off. The diode 605 is provided so that a first electrode thereof is connected to the first electrode of the second capacitor 401b and a second electrode thereof is connected to the first electrode of the first capacitor 401a.

Note that when charges are accumulated, charges are not to be accumulated in the first electrode of the second capacitor 401b until the voltage of the first capacitor 401a reaches a certain voltage, so that a desired voltage can be obtained in a short period. Meanwhile, when charges are discharged, in the case where the voltage of the first capacitor 401a drops, charges accumulated in the second capacitor 401b is supplied to the first capacitor 401a to compensate charges to the first electrode of the first capacitor 401a, so that charges can be efficiently discharged and a desired voltage can be efficiently obtained. In the structure in FIG. 6, which is described in this embodiment mode, the diode 605 prevents charges from leaking from the first capacitor 401a to the second capacitor 401b when charges are accumulated, and compensates charges from the second capacitor 401b in the case where the first capacitor 401a discharges charges and thus the voltage drops when charges are discharged.

Note that although in this embodiment mode, the structure of the switch 402a is specifically described, another switch achieves a similar function by differentiating a reference voltage, so description is omitted here.

Figure 7:
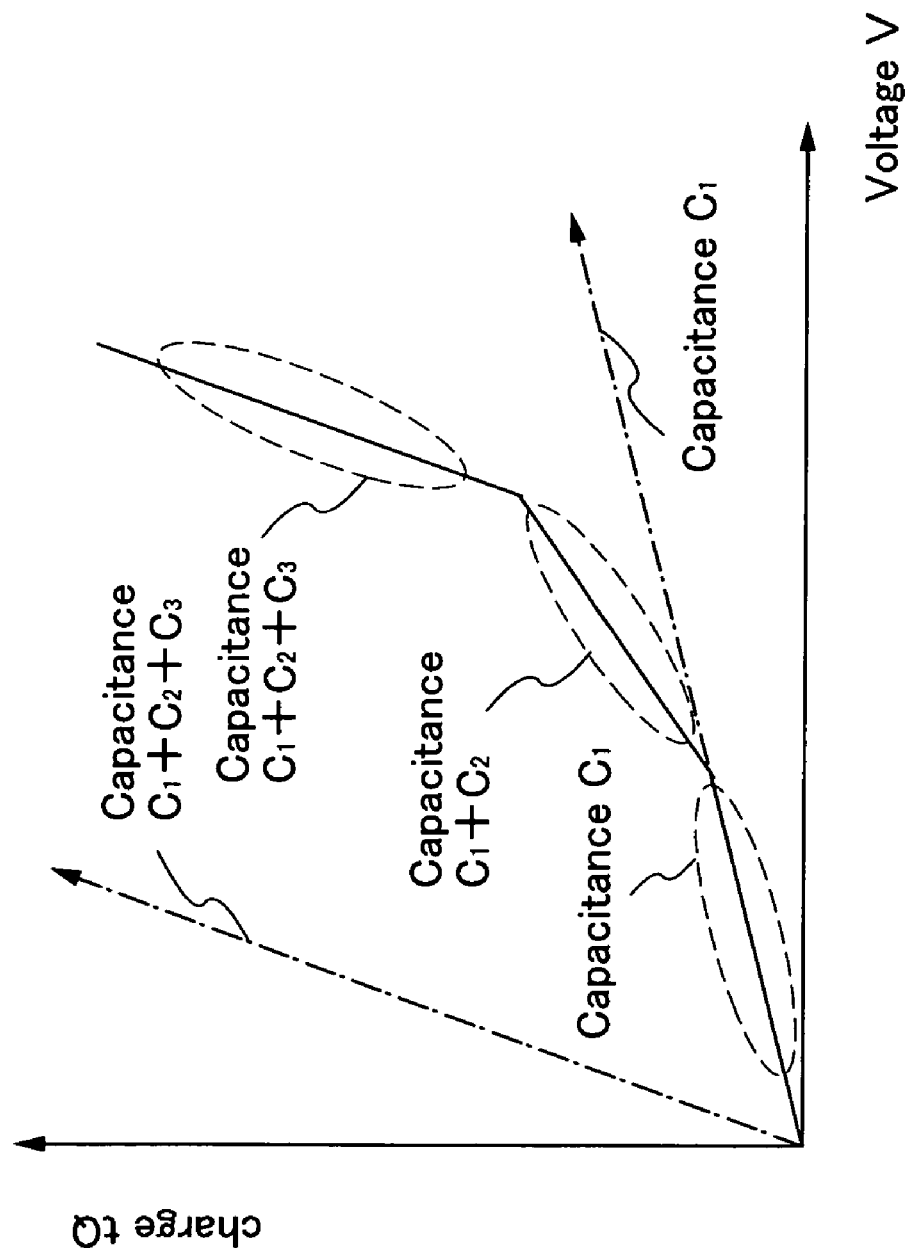
FIG. 7 is a diagram illustrating Embodiment Mode 1.

Next, an advantage in that the switch switches between the capacitors provided separately to vary electrostatic capacitance for charge accumulation, which is a feature in the charge accumulation circuit of the present invention, is described with reference to FIG. 7. In FIG. 7, voltage variation when charges are accumulated with the use of the electrostatic capacitances C1 to C3 of the first capacitor to the third capacitor included in the charge accumulation circuit illustrated in FIGS. 4A to 4C and 5A to 5C is specifically illustrated.

A graph of FIG. 7 shows a correlation between accumulation amount of charges and a voltage outputted to the constant voltage circuit, in the case where electrostatic capacitance (referred to as capacitance simply in the graph) of the capacitors included in the charge accumulation circuit is (C1+C2+C3) and the case where electrostatic capacitance of the capacitors included in the charge accumulation circuit is C1; electrostatic capacitance of the capacitors included in the charge accumulation circuit is varied from C1 to (C1+C2); and electrostatic capacitance of the capacitors included in the charge accumulation circuit is varied from (C1+C2) to (C1+C2+C3). Note that as for electrostatic capacitance of the capacitors, C1<(C1+C2)<(C1+C2+C3) is satisfied.

First, the graph of FIG. 7 illustrates a correlation between accumulation amount of charges and a voltage outputted to the constant voltage circuit, in the case where electrostatic capacitance is C1 and the case where electrostatic capacitance is (C1+C2+C3). Note that the amount of charges accumulated in the charge accumulation circuit depends on the voltage of the DC signal outputted from the rectifier circuit of the previous stage. Therefore, the case where the voltage of the DC signal outputted from the rectifier circuit is constant is illustrated in FIG. 7.

In the graph shown in FIG. 7, in the case where electrostatic capacitance is C1, from the relational expression of electrostatic capacitance C, a charge Q, and a voltage V: V=Q/C, variation of a voltage with respect to charge accumulation is large; however, the amount of charges which can be accumulated is small. On the other hand, in the case where electrostatic capacitance is (C1+C2+C3), from the relational expression of electrostatic capacitance C, charge Q, and voltage V: V=Q/C, variation of a voltage with respect to charge accumulation is small; however, the amount of charges which can be accumulated is large.

Next, a correlation between an accumulation amount of charges and a voltage outputted to the constant voltage circuit in the case where electrostatic capacitance is varied from C1 to (C1+C2) and the case where electrostatic capacitance is varied from (C1+C2) to (C1+C2+C3) is described. In the case where electrostatic capacitance is C1, from the relational expression of electrostatic capacitance C, charge Q, and voltage V: V=Q/C, variation of a voltage with respect to charge accumulation is large; however, the amount of charges which can be accumulated is small. However, in the structure of this embodiment mode, after the voltage reaches a desired voltage in a short period by charge accumulation, electrostatic capacitance can be varied from C1 to (C1+C2), and from (C1+C2) to (C1+C2+C3). Accordingly, after the voltage reaches a desired voltage by charge accumulation, charges which can be accumulated can be increased. Thus, in the semiconductor device provided with a charge accumulation circuit, which is described in this embodiment mode, by controlling a switch so that electrostatic capacitance of the charge accumulation circuit is small in an initial state in which energy is not accumulated, a desired voltage can be generated in a short period. After the desired power supply voltage is obtained, by controlling a switch so that electrostatic capacitance of the charge accumulation circuit is large, inputted charges can be efficiently accumulated and a stable voltage can be applied to the constant voltage circuit.

Note that this embodiment mode can be implemented in combination with any of technical elements of the other embodiment modes of this specification.

Embodiment Mode 2

In this embodiment mode, the structure of the semiconductor device provided with a charge accumulation circuit (also called an RFID tag, an ID chip, an IC tag, an ID tag, an RF tag, a wireless tag, an electronic tag, or a transponder), which is described in the above embodiment mode, is described.

A semiconductor device 800 in FIG. 8 includes, as an example, an antenna 801, a rectifier circuit 802, a charge accumulation circuit 803, a constant voltage circuit 804, a demodulation circuit 805, a modulation circuit 806, and a logic circuit 807. The logic circuit 807 includes a controller 808, a CPU (central processing unit) 809, a ROM 810 (read only memory) 810, and a RAM 811 (random access memory) 811. The logic circuit 807 is allowable as long as it includes a logic circuit such as the CPU 809, a volatile memory (typically, SRAM) as the RAM 811 serving as a work region, and a nonvolatile memory (typically, EEPROM) as the programmable ROM 810 which stores a program of the CPU 809, and it controls reading or writing data between blocks by the controller 808.

Note that the charge accumulation circuit 803 in the semiconductor device 800 can have the structure described in the above embodiment mode. That is, by controlling the switch so that electrostatic capacitance of the charge accumulation circuit is small in an initial state in which energy is not accumulated, a desired voltage can be generated in a short period. After the desired power supply voltage is obtained, by controlling the switch so that electrostatic capacitance of the charge accumulation circuit is large, inputted charges can be efficiently accumulated and a stable voltage can be applied to the constant voltage circuit.

In FIG. 8, a signal received from an external communication device by the antenna 801 is inputted to the rectifier circuit 802. An output signal from the rectifier circuit 802 is inputted to the demodulation circuit 805 and the charge accumulation circuit 803. A signal from the demodulation circuit 805 is inputted to the logic circuit 807 and data concerning unique data of the semiconductor device is outputted to the modulation circuit 806. Then, an output signal from the modulation circuit 806 is outputted to the antenna 801, and the signal is outputted to the external communication device of the semiconductor device. Further, the charge accumulation circuit 803 applies a voltage for outputting a given voltage in the constant voltage circuit 804 to the constant voltage circuit 804. Further, the constant voltage circuit 804 applies a power supply voltage for operating each circuit of the semiconductor device.

Note that methods for signal transmission between the communication device and the semiconductor device can be categorized into an electromagnetic coupling method, an electromagnetic induction method, a microwave method, and the like in accordance with the wavelength of a carrier wave. Note that in the case where a wireless signal is transmitted and received between the semiconductor device and the communication device within a long distance, a microwave method is desirably selected.

Note that this embodiment mode can be implemented in combination with any of technical elements of the other embodiment modes of this specification.

Embodiment Mode 3

In this embodiment mode, an example of fabricating a transistor included in the semiconductor device described in any of the above embodiment modes is described. In this embodiment mode, a mode is particularly described in which a semiconductor device provided with a transistor fabricated using a semiconductor film formed over an insulating substrate is formed.

Figure 9A:
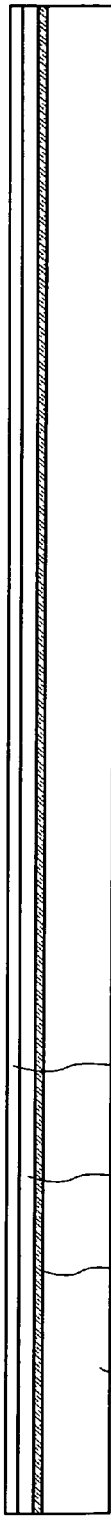
FIGS. 9A to 9D are views illustrating Embodiment Mode 3.

First, a release layer 1902 is formed on one surface of a substrate 1901, and then an insulating film 1903 to be a base and an amorphous semiconductor film 1904 (for example, a film containing amorphous silicon) are formed (FIG. 9A). The release layer 1902, the insulating film 1903, and the amorphous semiconductor film 1904 can be successively formed. Being formed successively, they are not exposed to the air and thus mixture of an impurity can be prevented.

As the substrate 1901, a glass substrate, a quartz substrate, a metal substrate, a stainless steel substrate, a plastic substrate which has heat resistance to a process temperature in the process in this embodiment mode, or the like is preferably used. Such a substrate has no significant limitation on its area or its shape. Thus, for example, in a case of using a substrate which has a rectangular shape having a side length of 1 meter or longer, productivity can be significantly increased. Such a merit is greatly advantageous as compared to a case of using a circular silicon substrate. Therefore, even in a case of forming an integrated circuit portion or an antenna larger, the cost can be low as compared to the case of using a silicon substrate.

Note that while the release layer 1902 is formed over an entire surface of the substrate 1901 in this process, the release layer 1902 may be selectively formed as necessary by a photolithography method and etching after a release layer is formed over an entire surface of the substrate 1901. Further, while the release layer 1902 is formed so as to be in contact with the substrate 1901, it is also allowed that an insulating film such as a silicon oxide ($SiO_x$) film, a silicon oxynitride ($SiO_xN_y$) (x>y) film, a silicon nitride ($SiN_x$) film, or a silicon nitride oxide ($SiN_xO_y$) (x>y) film is formed and the release layer 1902 is formed so as to be in contact with the insulating film, as necessary.

As the release layer 1902, a metal film, a layered structure of a metal film and a metal oxide film, or the like can be used. The metal film is formed to have a single-layer structure or a layered structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material including any of the above elements as its main component. The metal film can be formed by a sputtering method, various CVD methods such as a plasma CVD method, or the like. As the layered structure of a metal film and a metal oxide film, after the above metal film is formed, an oxide or oxynitride of the metal film can be formed on the surface of the metal film by performing plasma treatment in an oxygen atmosphere or an $N_2O$ atmosphere, or heat treatment in an oxygen atmosphere or an $N_2O$ atmosphere. Alternatively, a metal film is formed and then a surface thereof is treated with a highly oxidative solution such as an ozone solution, so that an oxide or oxynitride of the metal film can be formed on the surface of the metal film.

The insulating film 1903 is formed to have a single-layer structure or a layered structure of a film containing oxide of silicon or nitride of silicon by a sputtering method, a plasma CVD method, or the like. In the case where the insulating film to be a base has a two-layer structure, a silicon nitride oxide film may be formed for a first layer, and a silicon oxynitride film may be formed for a second layer, for example. In the case where the insulating film to be a base has a three-layer structure, a silicon oxide film, a silicon nitride oxide film, and a silicon oxynitride film may be formed for a first layer, a second layer, and a third layer, respectively. Alternatively, a silicon oxynitride film, a silicon nitride oxide film, and a silicon oxynitride film may be formed for a first layer, a second layer, and a third layer, respectively. The insulating film to be a base functions as a blocking film for preventing impurities from entering from the substrate 1901.

The semiconductor film 1904 is formed to a thickness of from 25 to 200 nm (preferably, from 30 to 150 nm) by a sputtering method, an LPCVD method, a plasma CVD method, or the like. As the semiconductor film 1904, an amorphous silicon film may be formed, for example.

Figure 9B:
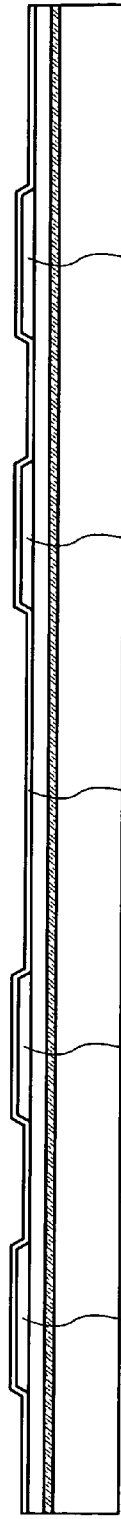

Next, the amorphous semiconductor film 1904 is crystallized by laser beam irradiation. Note that the amorphous semiconductor film 1904 may be crystallized by a method in which laser beam irradiation is combined with a thermal crystallization method using an RTA or an annealing furnace, or a thermal crystallization method using a metal element for promoting crystallization, or the like. After that, the obtained crystalline semiconductor film is etched so as to have a desired shape, so that semiconductor films 1904a to 1904d are formed. Then, a gate insulating film 1905 is formed so as to cover the semiconductor films 1904a to 1904d (see FIG. 9B).

An example of a manufacturing step of the semiconductor films 1904a to 1904d is briefly described below. First, an amorphous semiconductor film (for example, an amorphous silicon film) with a thickness of from 50 to 60 nm is formed by a plasma CVD method. Next, a solution containing nickel that is a metal element for promoting crystallization is retained on the amorphous semiconductor film, and a dehydrogenation treatment (at 500° C., for one hour) and a thermal crystallization treatment (at 550° C., for four hours) are performed on the amorphous semiconductor film, so that a crystalline semiconductor film is formed. After that, the crystalline semiconductor film is irradiated with laser beam from a laser, and a photolithography method and etching are used, so that the semiconductor films 1904a to 1904d are formed. Note that without being subjected to the thermal crystallization which uses the metal element for promoting crystallization, the amorphous semiconductor film may be crystallized only by laser beam irradiation.

As a laser, a continuous wave laser (a CW laser) or a pulsed wave laser (a pulsed laser) can be used. As a laser beam which can be used here, a laser beam emitted from one or more of the following can be used: a gas laser such as an Ar laser, a Kr laser, or an excimer laser; a laser of which medium is single crystalline YAG YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:YVO$_4$ laser (fundamental wave of 1064 nm) can be used. In this case, a power density of approximately 0.01 to 100 MW/cm$^2$ (preferably, 0.1 to 10 MW/cm$^2$) is necessary. Irradiation is conducted at a scanning rate of approximately 10 to 2000 cm/sec. It is to be noted that, a laser using, as a medium, single crystalline YAG; YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by carrying out Q switch operation, mode locking, or the like. In a case where a laser beam is oscillated at a repetition rate of higher than or equal to 10 MHz, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which continuously grow in a scanning direction can be obtained.

Next, a gate insulating film 1905 which covers the semiconductor films 1904a to 1904d is formed. The gate insulating film 1905 is formed to have a single-layer structure or a layered structure of a film containing oxide of silicon or nitride of silicon by a CVD method, a sputtering method, or the like. In specific, the gate insulating film 1905 is formed to have a single-layer structure or a layered structure of a silicon oxide film, a silicon oxinitride film, or a silicon nitride oxide film.

Alternatively, the gate insulating film 1905 may be formed by performing a high-density plasma treatment on the semiconductor films 1904a to 1904d to oxidize or nitride the surfaces thereof. For example, the gate insulating film 1905 is formed by a plasma treatment introducing a mixed gas of a rare gas such as He, Ar, Kr, or Xe and oxygen, nitrogen oxide (NO$_2$), ammonia, nitrogen, hydrogen, or the like. When excitation of the plasma in this case is performed by introduction of a microwave, plasma with a low electron temperature and high density can be generated. By an oxygen radical (there is a case where an OH radical is included) or a nitrogen radical (there is a case where an NH radical is included) generated by this high-density plasma, the surfaces of the semiconductor films can be oxidized or nitrided.

By treatment using such high-density plasma, an insulating film with a thickness of from 1 to 20 nm, typically from 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon or polycrystalline silicon) directly, unevenness of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without abnormal oxidation reaction in a crystal grain boundary.

As the gate insulating film 1905, an insulating film formed by the high-density plasma treatment may be used by itself, or an insulating film of silicon oxide, silicon oxynitride, silicon nitride, or the like may be formed thereover by a CVD method using plasma or thermal reaction, so as to make a laminate. In any case, transistors each including an insulating film formed by high-density plasma, in a part of the gate insulating film or in the whole gate insulating film, can reduce variation in the characteristics.

Furthermore, a semiconductor film is irradiated with a continuous wave laser beam or a laser beam oscillated at a repetition rate of higher than or equal to 10 MHz and is scanned in one direction for crystallization, so that each of the semiconductor films 1904a to 1904d which has a characteristic that the crystal grows in the scanning direction of the laser beam is obtained. When transistors are provided so that the scanning direction is aligned with the channel length direction (a direction in which carriers flow when a channel formation region is formed) and the above gate insulating layer is used, thin film transistors (TFTs) with less characteristic variation and high field effect mobility can be obtained.

Next, a first conductive film and a second conductive film are stacked over the gate insulating film 1905. Here, the first conductive film is formed to a thickness of from 20 to 100 nm by a plasma CVD method, a sputtering method, or the like, and the second conductive film is formed to a thickness of from 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing the above elements as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a layered structure of a molybdenum film, an aluminum film, and a molybdenum film is preferably employed.

Next, a resist mask is formed by a photolithography method, and etching treatment for forming a gate electrode and a gate wiring is performed, so that gate electrodes 1907 are formed over the semiconductor films 1904a to 1904d.

Next, a resist mask is formed by a photolithography method, and an impurity element imparting n-type conductivity is added to the semiconductor films 1904a to 1904d at low concentration by an ion doping method or an ion implantation method. As an impurity element imparting n-type conductivity, an element which belongs to Group 15 may be used. For example, phosphorus (P) or arsenic (As) is used.

Next, an insulating film is formed so as to cover the gate insulating film 1905 and the gate electrodes 1907. The insulating film is formed to have a single-layer structure or a layered structure of a film including an inorganic material such as silicon, an oxide of silicon, or a nitride of silicon, and a film including an organic material such as an organic resin, by a plasma CVD method, a sputtering method, or the like.

Next, the insulating film is selectively etched by anisotropic etching for mainly etching in a perpendicular direction, so that insulating films 1908 (also referred to as side walls) which are in contact with side surfaces of the gate electrodes 1907 are formed. The insulating films 1908 are used as masks for doping when LDD (lightly doped drain) regions are formed later.

Figure 9C:
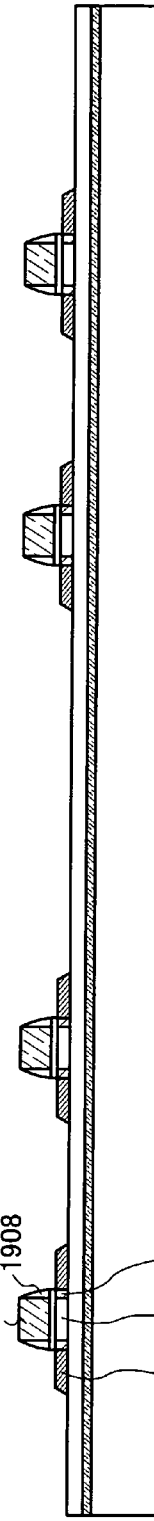

Next, a resist mask formed by a photolithography method, the gate electrodes 1907, and the insulating films 1908 are used as masks to add an impurity element imparting n-type conductivity to the semiconductor films 1904*a* to 1904*d*, so that channel formation regions 1906*a*, first impurity regions 1906*b*, and second impurity regions 1906*c* are formed (see FIG. 9C). The first impurity regions 1906*b* function as source and drain regions of the thin film transistor, and the second impurity regions 1906*c* function as LDD regions. The concentration of impurity elements contained in the second impurity regions 1906*c* is lower than that of impurity elements contained in the first impurity regions 1906*b*.

Figure 9D:
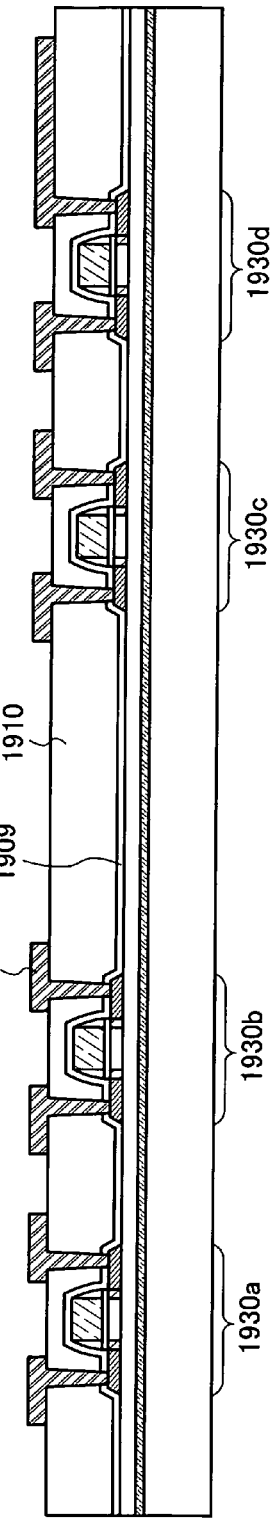

Next, an insulating film is formed as a single layer or a laminate so as to cover the gate electrodes 1907, the insulating films 1908, and the like, so that conductive films 1931 which function as source and drain electrodes of the thin film transistor are formed over the insulating film. Consequently, thin film transistors 1930*a* to 1930*d* are obtained (FIG. 9D).

The insulating film is formed as a single layer or a laminate using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film is formed to have a two-layer structure. A silicon nitride oxide film is formed as a first insulating film 1909, and a silicon oxynitride film is formed as a second insulating film 1910.

It is to be noted that before the insulating films 1909 and 1910 are formed or after either one or both the insulating films 1909 and 1910 are formed, heat treatment for recovering the crystallinity of the semiconductor films 1904*a* to 1904*d*, for activating the impurity element which has been added to the semiconductor film, or for hydrogenating the semiconductor film is preferably performed. For the heat treatment, thermal annealing, a laser annealing method, an RTA method, or the like is preferably employed.

The conductive films 1931 are formed in the following manner. The insulating films 1909 and 1910, and the like are etched using a resist pattern as a mask after forming the resist pattern by a photolithography method, and contact holes are formed to expose the first impurity regions 1906*b*. Then, a conductive film is formed so as to fill the contact holes and the conductive film is selectively etched. It is to be noted that before formation of the conductive film, a silicide may be formed over the surfaces of the semiconductor films 1904*a* to 1904*d* exposed in the contact holes.

The conductive film 1931 is formed by a CVD method, a sputtering method, or the like to have a single-layer structure or a layered structure with the use of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of the above elements as its main component. An alloy material containing aluminum as its main component corresponds to a material which contains aluminum as its main component and also contains nickel, or an alloy material which contains aluminum as its main component and also contains nickel and one or both of carbon and silicon, for example. The conductive film 1931 may employ, for example, a layered structure of a barrier film, an aluminum-silicon (Al—Si) film, and a barrier film, or a layered structure of a barrier film, an aluminum-silicon (Al—Si) film, a titanium nitride film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 1931. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film can be reduced so that favorable contact with the crystalline semiconductor film can be obtained.

Figure 10A:
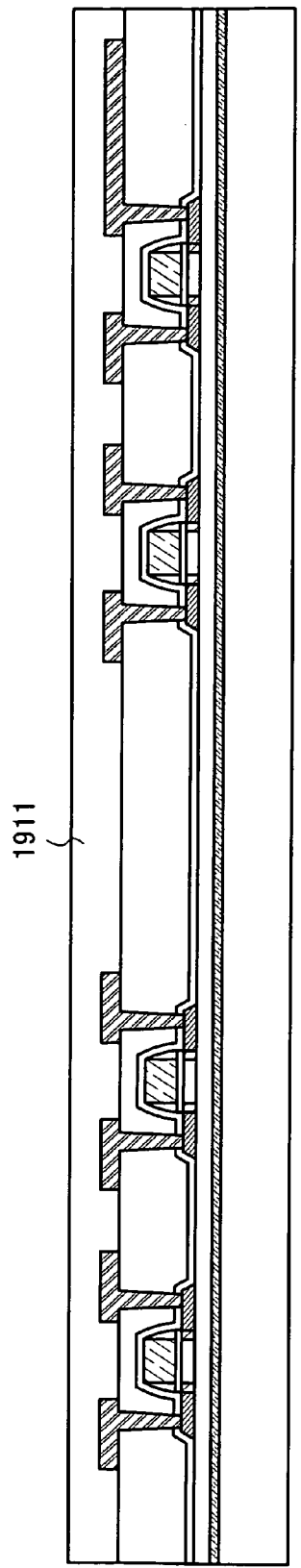
FIGS. 10A and 10B are views illustrating Embodiment Mode 3.

Next, an insulating film 1911 is formed so as to cover the conductive films 1931 (FIG. 10A). The insulating film 1911 is formed to have a single-layer structure or a layered structure by using an inorganic material or an organic material by a CVD method, a sputtering method, an SOG method, a droplet discharging method, a screen printing method, or the like. The insulating film 1911 is preferably formed to a thickness of from 0.75 to 3 μm.

Figure 10B:
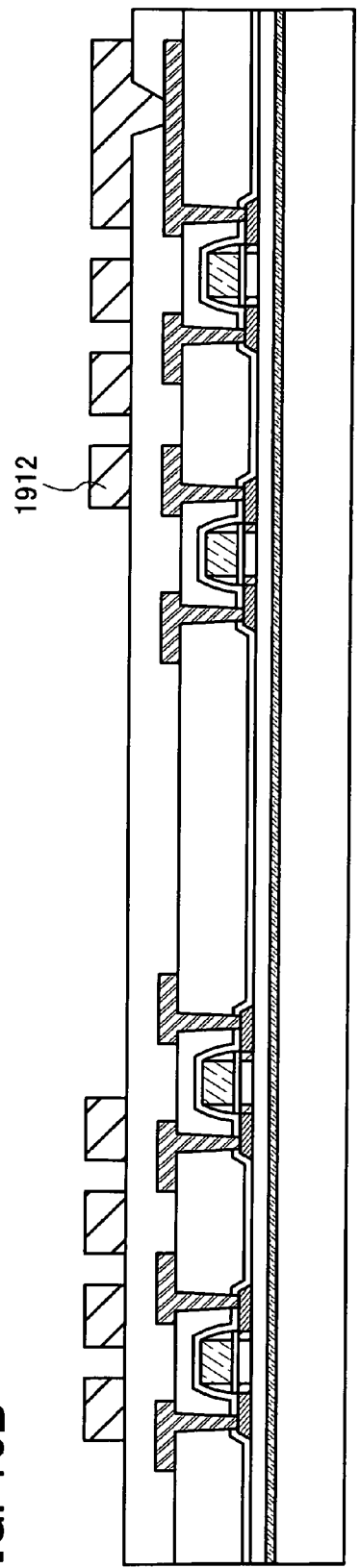

Next, a conductive film 1912 which functions as an antenna is selectively formed on a surface of the insulating film 1911 (FIG. 10B).

The conductive film 1912 is formed in the following manner. After the insulating film 1911 is selectively etched by a photolithography method and etching to form a contact hole which exposes the conductive film 1931, a conductive film is formed so as to fill the contact hole and the conductive film is selectively etched.

Further, the conductive film 1912 may be formed using a conductive material by a CVD method, a sputtering method, a printing method such as screen printing or gravure printing, a plating process, or the like. The conductive material is formed to have a single-layer structure or a layered structure with the use of an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing any of the above-described elements as its main component.

For example, in a case of forming the conductive film 1912 functioning as an antenna by a screen printing method, the conductive film can be formed by being selectively printed with conductive paste in which conductive particles each having a grain size of from several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), and titanium (Ti) or silver halide can be used. By using a screen printing method, a process can be simplified and cost reduction can be achieved.

Figure 11A:
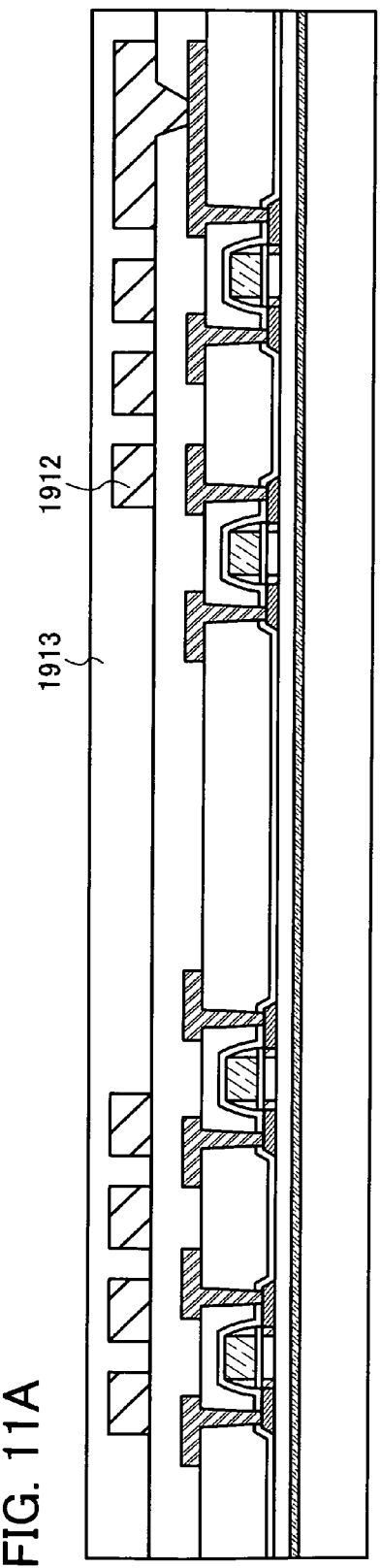
FIGS. 11A and 11B are views illustrating Embodiment Mode 3.

Next, an insulating film 1913 is formed so as to cover the conductive film 1912 functioning as an antenna (FIG. 11A).

The insulating film 1913 is formed by a CVD method, a sputtering method, an SOG method, a droplet discharging method, a screen printing method, or the like to have a single-layer structure of an inorganic material such as an oxide of silicon or a nitride of silicon (for example, a silicon oxide film, a silicon oxynitride film, a silicon nitride film, or a silicon nitride oxide film); or an organic material such as polyimide, polyamide, benzocyclobutene, acrylic, or epoxy; a siloxane material; or the like or a layered structure of any of the above.

Next, an element formation layer including the thin film transistors 1930a to 1930d and the conductive film 1912 which functions as an antenna is released from the substrate 1901.

Figure 11B:
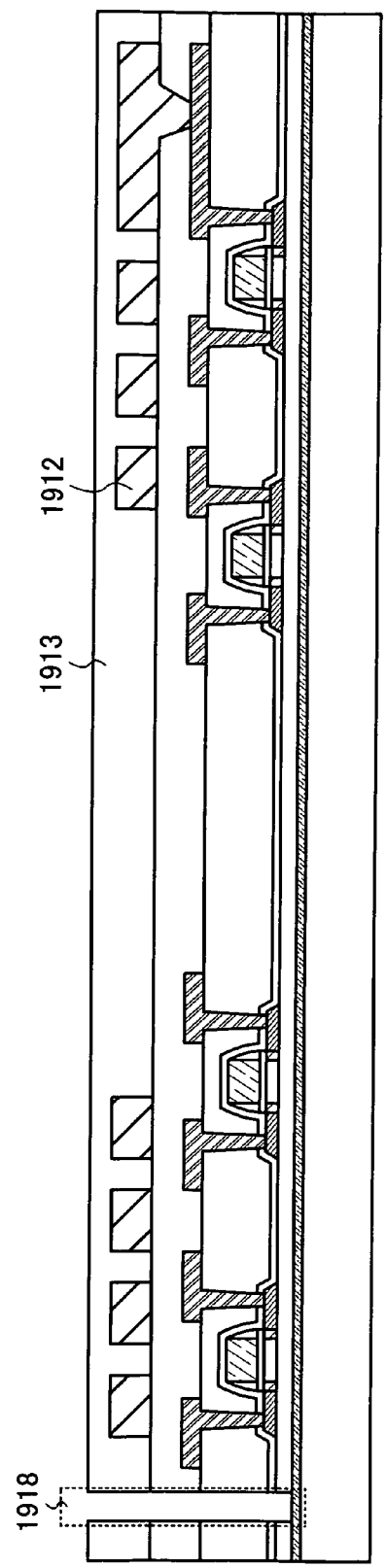

First, an opening 1918 is formed by laser beam irradiation (FIG. 11B). After that, one surface (here, a surface of the insulating film 1917) of the element formation layer is attached to a first sheet material 1920, and then the element formation layer is released from the substrate 1901 by a physical force (FIG. 12A). As the first sheet material 1920, a hot-melt film or the like can be used. In the case of releasing the first sheet material 1920 later, a heat release tape of which adhesion is reduced by being heated can be used.

Note that releasing is performed with a surface to be released getting wet with water or a solution such as ozone water, so that elements such as the thin film transistors 1930a to 1930d can be prevented from being damaged by static electricity or the like. Further, by reusing of the substrate 1901 from which the element formation layer is released, cost reduction can be achieved.

Next, a second sheet material 1921 is formed on the other surface of the element formation layer (a surface exposed by releasing from the substrate 1901) (FIG. 12B). As the second sheet material 1921, a hot-melt film or the like can be used and the second sheet material 1921 can be attached to the other surface of the element formation layer by one or both of a heat treatment and a pressure treatment. In the case of using a heat release tape for the first sheet material 1920, peeling can be performed utilizing heat applied at the time of attaching the second sheet material 1921.

Next, the element formation layer provided over the second sheet material 1921 is selectively cut by dicing, scribing, a laser cutting method, or the like and thus, a plurality of semiconductor devices can be obtained. By using a flexible substrate such as a plastic substrate for the second sheet material 1921, a flexible semiconductor device can be formed.

Although this embodiment mode describes the case where an element such as a thin film transistor or an antenna is formed over the substrate 1901 and then released from the substrate 1901 so that a flexible semiconductor device is formed, the present invention is not limited to this. Alternatively, a semiconductor device in which an element such as a thin film transistor or an antenna is formed over the substrate 1901 may be formed by, for example, applying the process in FIGS. 12A and 9A without providing the release layer 1902 over the substrate 1901.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Note that this embodiment mode can be implemented in combination with any of technical elements of the other embodiment modes in this specification.

Embodiment Mode 4

In this embodiment mode, a mode is described in which a single crystal semiconductor is used as a semiconductor film over an insulating substrate, which is used for fabrication of a transistor of a semiconductor device, in Embodiment Mode 3.

Hereinafter, this embodiment mode will describe a method for fabricating an insulating substrate on which a single crystal semiconductor is formed (hereinafter referred to as an SOI (silicon on insulator) substrate).

Figure 13A:
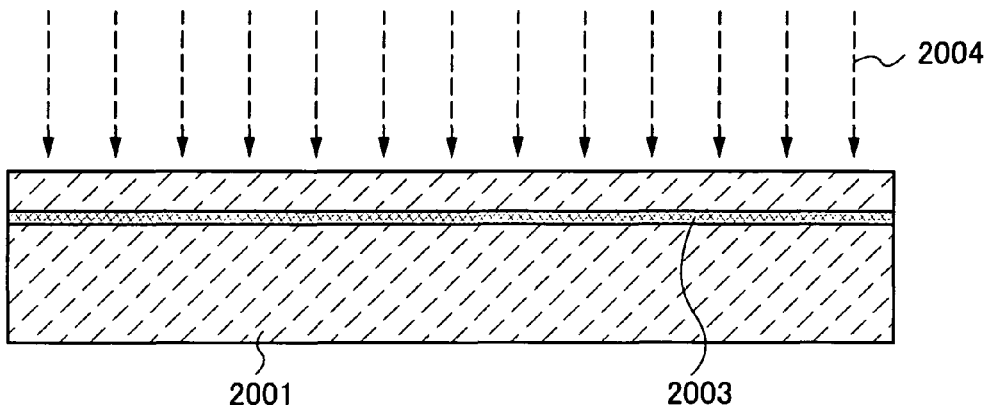
FIGS. 13A to 13C are views illustrating Embodiment Mode 4.
Figure 15A:
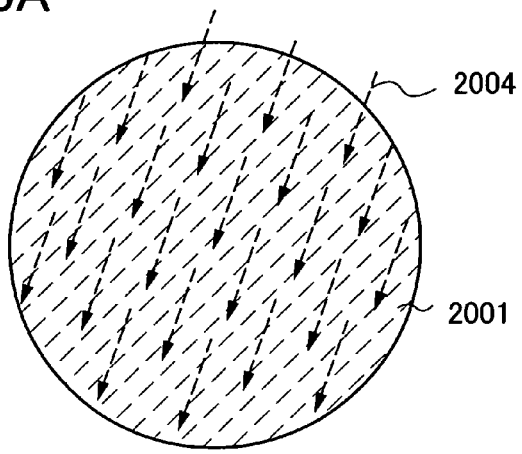
FIGS. 15A to 15C are diagrams illustrating Embodiment Mode 4.

First, a semiconductor substrate 2001 is prepared (see FIGS. 13A and 15A). As the semiconductor substrate 2001, a commercial semiconductor substrate such as a silicon substrate, a germanium substrate, or a compound semiconductor substrate of gallium arsenide, indium phosphide, or the like may be used. A size of a commercial silicon substrate is typically five inch (125 mm) in diameter, six inch (150 mm) in diameter, eight inch (200 mm) in diameter, or 12 inch (300 mm) in diameter. The shape of a commercial substrate is a circle in many cases. Further, a thickness of a commercial substrate may be approximately smaller than or equal to 1.5 mm.

Next, ions 2004 accelerated by an electrical field are introduced at a given depth from a surface of the semiconductor substrate 2001 so that an ion-doped layer 2003 is formed (see FIGS. 13A and 15A). The ions 2004 are introduced in view of the thickness of an SOI layer which will be transferred to a base substrate later. A thickness of the SOI layer is preferably from 5 to 500 nm, more preferably, from 10 to 200 nm. The accelerating voltage and the dose of ions at the time of introduction of ions are determined as appropriate in view of the thickness of the SOI substrate to be transferred. As the ions 2004, ions of halogen such as hydrogen, helium, or fluorine can be used. Note that as the ions 2004, ion species of one atom or a plurality of the same atoms generated by exciting a source gas selected from hydrogen, helium, or a halogen element by plasma are preferably used. In the case of introducing hydrogen ions, the hydrogen ions preferably include $H^+$, $H_2^+$, and $H_3^+$ ions with $H_3^+$ ions increased in proportion because introduction efficiency of $H_3^+$ ions can be improved and introduction time can be reduced. Further, with such a structure, the SOI layer can be easily separated from the semiconductor substrate.

Note that in order to form the ion-doped layer 2003 at a given depth, there may be a case where the ions 2004 should be introduced at a high dose. At this time, a surface of the semiconductor substrate 2001 may be rough depending on a condition. Therefore, a 50 to 200 nm-thick silicon nitride layer or silicon nitride oxide layer may be provided as a protective layer on a surface of the semiconductor substrate, into which ions are introduced.

Figure 13B:
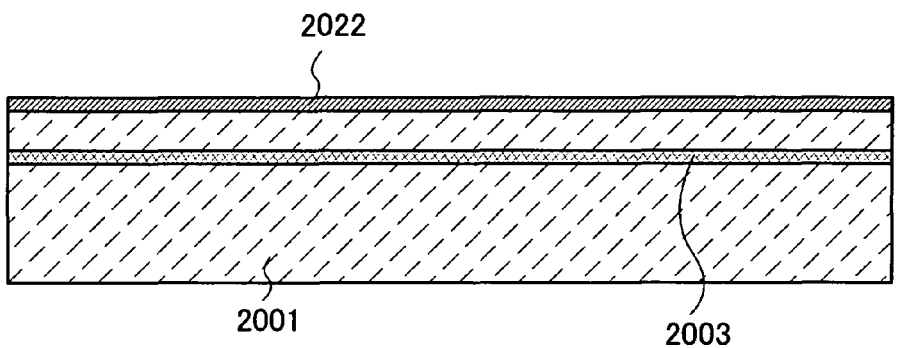
Figure 15B:
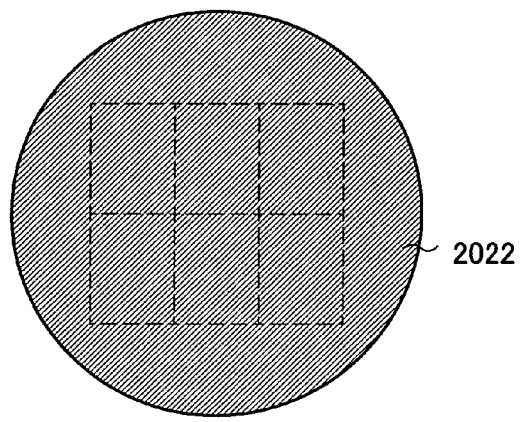

Then, a bonding layer 2022 is formed over the semiconductor substrate 2001 (see FIGS. 13B and 15B). The bonding layer 2022 is formed over a surface of the semiconductor substrate 2001 which is to form a bond with a base substrate. Here, as the bonding layer 2022, a silicon oxide layer formed by a chemical vapor deposition method using an organic silane gas as a material gas as described above is preferably used. Alternatively, a silicon oxide layer formed by a chemical vapor deposition method using a silane gas as a material gas may be used. Film formation by a chemical vapor deposition method is performed at a temperature, for example, 350° C. or lower, at which degassing of the ion-doped layer 2003 that is formed in the semiconductor substrate 2001 does not occur. Note that heat treatment for separating an SOI layer from a semiconductor substrate such as a single crystal semiconductor substrate or a polycrystalline semiconductor substrate is performed at a higher heat treatment temperature than the formation temperature by a chemical vapor deposition method.

Figure 13C:
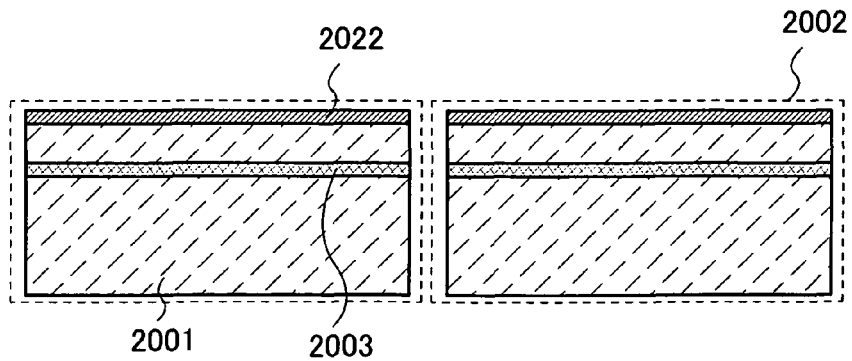
Figure 15C:
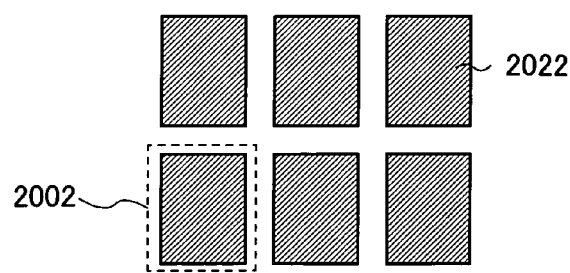

Then, the semiconductor substrate 2001 is processed to have desired size and shape (see FIGS. 13C and 15C). Specifically, the semiconductor substrate 2001 is processed to have a desired size. FIG. 15C shows an example in which the semiconductor substrate 2001 that has a circular shape is cut to obtain rectangular semiconductor substrates 2002. At this time, the bonding layer 2022 and the ion-doped layer 2003 are also cut. That is, the semiconductor substrates 2002 each of which has a desired size, in each of which the ion-doped layer 2003 is formed at a given depth, and each of which has a surface (a bonding surface which is to form a bond with a base substrate) provided with the bonding layer 2022 are obtained.

The semiconductor substrate 2001 is preferably cut in advance to have the size of a desired semiconductor device. The semiconductor substrate 2001 is cut by a cutting device such as a dicer or a wire saw, laser cutting, plasma cutting, electronic beam cutting, or any cutting means.

The order of the steps up to and including formation of the bonding layer over a surface of the semiconductor substrate can be changed as appropriate. FIGS. 13A to 13C and 15A to 15C show an example in which after the ion-doped layer is formed in the semiconductor substrate and the bonding layer is formed over a surface of the semiconductor substrate, the semiconductor substrate is processed to have a desired size. It is also allowed that, for example, after the semiconductor substrate is processed to have a desired size, the ion-doped layer is formed in the semiconductor substrate which has a desired size and the bonding layer is formed over a surface of the semiconductor substrate which has a desired size.

Figure 14A:
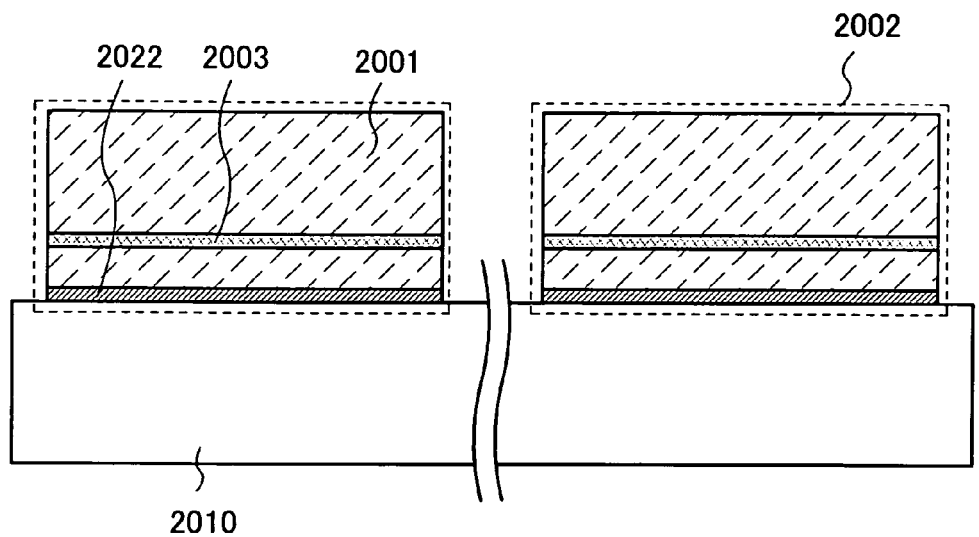
FIGS. 14A and 14B are views illustrating Embodiment Mode 4.

Then, the base substrate 2010 and the semiconductor substrate 2002 are attached to each other. FIG. 14A shows an example in which the base substrate 2010 is placed close to the surface of the semiconductor substrate 2002, over which the bonding layer 2022 is formed, to bond the base substrate 2010 and the bonding layer 2022 to each other, so that the base substrate 2010 and the semiconductor substrate 2002 are attached to each other. Note that a surface which is to form a bond (bonding surface) is preferably cleaned sufficiently. By placing the base substrate 2010 in close contact with the bonding layer 2022, a bond is formed therebetween by Van der Waals forces. By pressing the base substrate 2010 and the semiconductor substrate 2002 against each other, a strong bond can be formed by hydrogen bonding.

In order to form a favorable bond between the base substrate 2010 and the bonding layer 2022, the bonding surface may be activated. For example, one or both of the surfaces which are to form a bond are irradiated with an atomic beam or an ion beam. When an atomic beam or an ion beam is used, an inert gas neutral atom beam or inert gas ion beam of argon or the like can be used. Alternatively, plasma irradiation or radical treatment is performed. Such a surface treatment facilitates formation of a bond between different kinds of materials even at a temperature of 400° C. or lower.

After the base substrate 2010 and the semiconductor substrate 2002 are attached to each other with the bonding layer 2022 interposed therebetween, it is preferable that heat treatment or pressure treatment be performed. Heat treatment or pressure treatment makes it possible to increase bonding strength. The heat treatment is preferably performed at a temperature lower than or equal to the upper temperature limit of the base substrate 2010. The pressure treatment is performed so that pressure is applied perpendicularly to the bonding surface, in view of the pressure resistance of the base substrate 2010 and the semiconductor substrate 2002.

Figure 14B:
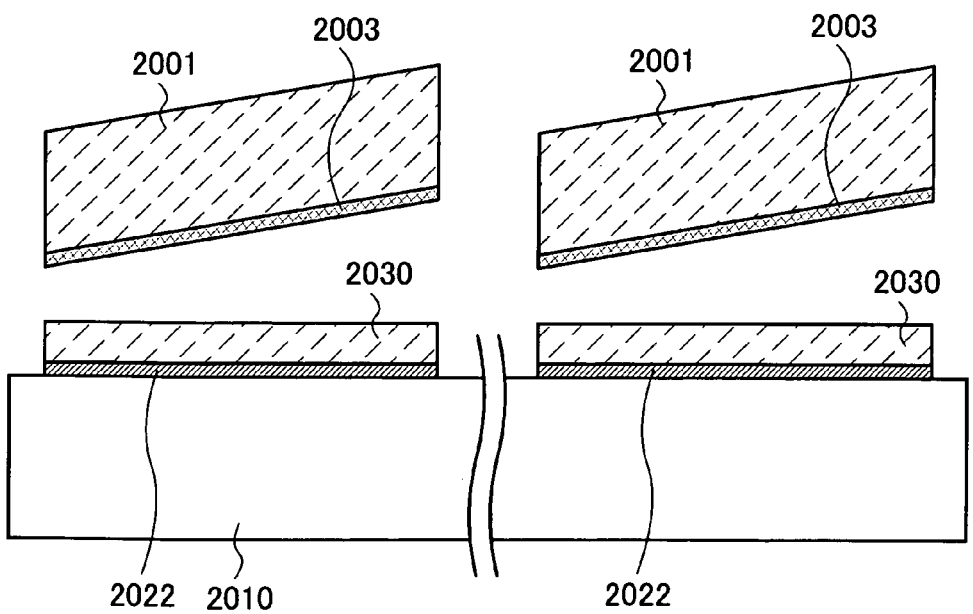

Then, heat treatment is performed to partially separate the semiconductor substrate 2002 from the base substrate 2010 with the ion-doped layer 2003 used as a cleavage plane (see FIG. 14B). The heat treatment is preferably performed at a temperature ranging from the temperature at which the bonding layer 2022 is formed to the upper temperature limit of the base substrate 2010. When the heat treatment is performed at, for example, 400° C. to 600° C., a change occurs in the volume of fine voids formed in the ion-doped layer 2003, which enables separation to occur along the ion-doped layer 2003. Because the bonding layer 2022 is bonded to the base substrate 2010, an SOI layer 2030 having the same crystallinity as the semiconductor substrate 2002 is left remaining over the base substrate 2010.

Thus, an SOI structure is formed in which the SOI layer 2030 is provided over the base substrate 2010 with the bonding layer 2022 interposed therebetween. Note that the SOI substrate has a structure in which a plurality of SOI layers are provided over one base substrate with the bonding layer interposed therebetween.

Note that chemical mechanical polishing (CMP) is preferably performed to planarize a surface of the SOI layer obtained by separation. Alternatively, a surface of the SOI layer is irradiated with a laser beam for planarization without using a physical polishing means such as CMP. Note that irradiation with a laser beam is preferably performed in a nitrogen atmosphere in which oxygen concentration is lower than or equal to 10 ppm. This is because a surface of the SOI layer could possibly be rough if laser beam irradiation is performed in an oxygen atmosphere. Further, CMP or the like may be performed for thinning the obtained SOI layer.

By the method for fabricating an SOI substrate, which is described in this embodiment mode, the SOI layer 2030 of which a bonding portion has a high bonding strength can be obtained even in the case where the base substrate 2010 is a glass substrate or the like of which an upper temperature limit is lower than or equal to 600° C. Further, since the process may be performed at 600° C. or lower, any of a variety of glass substrates that are used in the electronics industry, called an alkali-free glass substrate, such as aluminosilicate glass substrates, aluminoborosilicate glass substrates, and barium borosilicate glass substrates, can be used as the base substrate 2010. It is needless to say that a ceramics substrate, a sapphire substrate, a quartz substrate, or the like may alternatively be used.

In the case of the SOI substrate described in this embodiment mode, a single crystal semiconductor film can be formed directly on an insulating substrate such as a glass substrate; therefore, a crystallization process such as laser crystallization of a semiconductor film for the purpose of improving semiconductor characteristics is not required. Thus, because an SOI substrate is fabricated and a transistor and the like are fabricated using the method described in Embodiment Mode 3 so that a semiconductor device can be formed using an element which has a small variation in transistor characteristics, the semiconductor device can be formed to be highly reliable.

Note that this embodiment mode can be implemented in combination with any of technical elements of the other embodiment modes in this specification.

Embodiment Mode 5

In this embodiment mode, an example of fabricating a transistor included in the semiconductor device described in any of the above embodiment modes is described. In this embodiment mode, a mode is particularly described in which a transistor included in the semiconductor device is formed using a single crystal silicon with reference to FIGS. 16A to 17.

First, a fabrication process of a transistor is described with reference to FIG. 16A. A silicon substrate 2601 made of single-crystal silicon is prepared. Then, a p-well 2602 is selectively formed in an element formation region in a main surface (an element formation surface or a circuit formation surface) of the n-type silicon substrate 2601. Further, the silicon substrate 2601 can be made thinner by, for example, polishing the back surface thereof. By making the silicon substrate 2601 thinner in advance, a lightweight and thin semiconductor device can be formed.

Next, a field oxide film 2603 to be an element isolation region for partitioning the first element formation region and the second element formation region is formed. The field oxide film 2603 is a thick thermal oxide film and may be formed by a known LOCOS method. Note that the method for partitioning the element formation regions is not limited to the LOCOS method. For example, by using a trench isolation method, the element isolation region may be formed to have a trench structure, or a combination of a LOCOS structure and a trench structure.

Next, a gate insulating film 2604 is formed by, for example, thermally oxidizing the surface of the silicon substrate. The gate insulating film 2604 may be formed by a CVD method; and a silicon oxynitride film, a silicon oxide film, a silicon nitride film, or a stack thereof can be used.

Next, a layered film of a polysilicon layer 2605a and a silicide layer 2605b is formed over the entire surface. By forming the layered film by lithography and dry etching, gate electrodes 2605 each having a polycide structure are formed over the gate insulating film. In order to reduce resistance, the polysilicon layers 2605a may be doped with phosphorus (P) at a concentration of approximately $10^{21}/cm^3$ in advance, or alternatively, an n-type impurity may be diffused into the polysilicon layers 2605a at a high concentration after forming the polysilicon layers 2605a. Further, the silicide layers 2605b can be formed of a material such as molybdenum silicide ($MoSi_x$), tungsten silicide ($WSi_x$), tantalum siliside ($TaSi_x$), or titanium silicide ($TiSi_x$) in accordance with a known method.

Note that sidewalls are formed on the side walls of the gate electrodes. For example, an insulating material layer formed of silicon oxide may be deposited on the entire surface by a CVD method, and the insulating material layer may be etched back to form the sidewalls. At the etch back, the gate insulating film may be selectively removed in a self-aligned manner.

Next, the exposed silicon substrate is subjected to ion implantation, to form a source region and a drain region. The first element formation region for forming a p-channel FET is coated with a resist material, and arsenic (As) or phosphorus (P), which is an n-type impurity, is implanted into the silicon substrate to form a source region 2613 and a drain region 2614. In addition, the second element formation region for forming an n-channel FET is coated with a resist material, and boron (B), which is a p-type impurity, is implanted into the silicon substrate to form a source region 2615 and a drain region 2616.

Next, an activation treatment is performed in order to activate the ion-implanted impurities and to recover crystal defects in the silicon substrate, which are caused by the ion implantation.

After the activation, an interlayer insulating film, a metal wiring which functions as a source electrode or a drain electrode, and the like are formed. An interlayer insulating film 2617 is formed of a silicon oxide film, a silicon oxynitride film, or the like by a plasma CVD method or a low-pressure CVD method. Note that an interlayer insulating film of phosilicate glass (PSG), borosilicate glass (BSG), or phosphoborosilicate glass (PBSG) may be further formed thereover.

Metal electrodes 2619, 2621, 2620, and 2622 are formed after contact holes reaching the source regions and the drain regions of the respective FETs in the interlayer insulating film 2617 and the gate insulating film 2604 are formed. Aluminum (Al), which is commonly used as a low resistance material, may be used for the metal electrodes 2619, 2621, 2620, and 2622. Alternatively, a layered structure of Al and titanium (Ti) may be employed.

Note that the contact holes may be formed by electron beam direct writing lithography. In electron beam direct writing lithography, positive resist for electron beam lithography is formed on the entire surface of the interlayer insulating film 2617, and a portion irradiated with an electron beam is dissolved using a developing solution. Then, holes are opened in the resist of a position where the contact holes are to be formed and dry etching is performed using the resist as a mask, so that predetermined positions in the interlayer insulating film 2617 and the gate insulating film 2604 can be etched to form the contact holes. Thus, a p-channel transistor 2651 and an n-channel transistor 2652 can be fabricated using a single crystal substrate (FIG. 16A).

Next, as shown in FIG. 16B, an interlayer film 2624 is formed. Then, the interlayer film 2624 is etched to form a contact hole so that the metal electrode 2622 is partially exposed. The interlayer film 2624 is not limited to a resin and may be any other film such as a CVD oxidation film; however, the interlayer film 2624 is desirably a resin in terms of planarity. Alternatively, a contact hole may be formed using a photosensitive resin without the etching. After that, a wiring 2625 in contact with the metal electrode 2622 through the contact hole is formed over the interlayer film 2624.

Next, a conductive film 2626 functioning as an antenna is formed so as to contact with the wiring 2625. The conductive film 2626 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), Zinc (Zn), Tin (Sn), or nickel (Ni). Alternatively, as the conductive film 2626, a film formed of an alloy containing any of the above metals as its main component or a film formed of a compound containing any of the above metals may be used. The conductive film 2626 can be formed to have a single-layer structure or layered structure of the above films.

The conductive film 2626 can be formed by a CVD method, a sputtering method, a printing method such as screen printing or gravure printing, a droplet discharging method, a dispensing method, a plating method, a photolithography method, an evaporation method, or the like.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Figure 17:
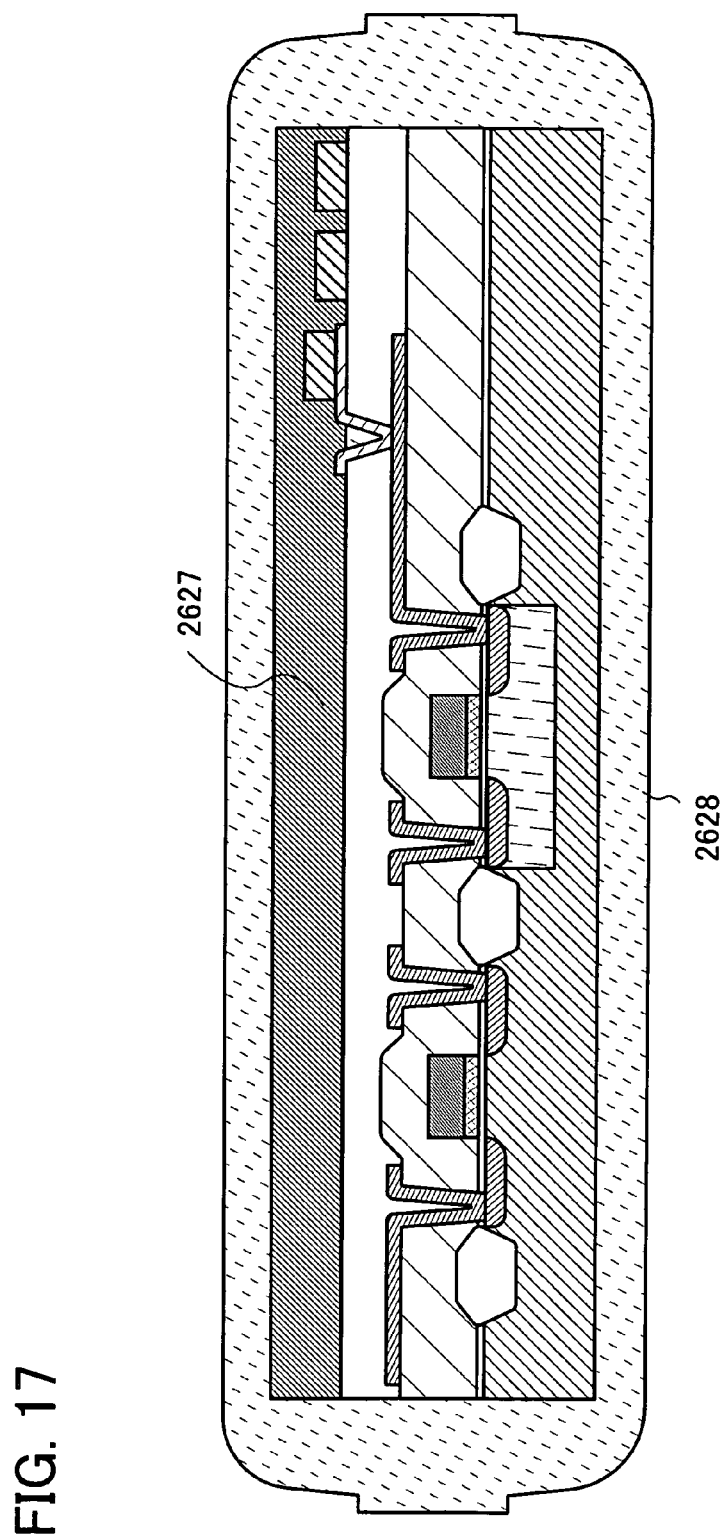
FIG. 17 is a view illustrating Embodiment Mode 5.

Next, as shown in FIG. 17, a protective film 2627 is formed so as to cover the conductive film 2626 which functions as an antenna. The protective film 2627 is formed of a silicon nitride film, a silicon oxide film, or a silicon nitride oxide film.

Further, an organic resin film may be formed instead of the silicon nitride film or the like, or an organic resin film may be stacked over the protective film. As an organic resin material, polyimide, polyamide, acrylic, benzocyclobutene (BCB), or the like can be used. It is advantageous to use an organic resin film in that, for example, the method for forming the film is simple, parasitic capacitance can be reduced because of the low dielectric constant, and it is suitable for planarization. It is needless to say that an organic resin film other than the ones described above may be used alternatively.

Then, as shown in FIG. 17, a semiconductor device can be completed by being covered with films 2628. A protective film may be provided on a surface of the film 2628 to prevent penetration of moisture, oxygen, or the like. The protective film can be formed of oxide containing silicon or nitride containing silicon. Further, a pattern which is to be a booster antenna of the semiconductor device may be formed on the film.

A product which is reduced in size and weight can be provided by using such a semiconductor device formed over a single crystal substrate. Further, a semiconductor device which is reduced in size can be made by using such a semiconductor device, and a variation in transistor characteristics is small, which is preferable.

Note that this embodiment mode can be implemented in combination with any of technical elements of the other embodiment modes in this specification.

Embodiment Mode 6

In this embodiment mode, uses of a semiconductor device of the present invention, which communicates data by wireless communication, is described. A semiconductor device of the present invention can be used as a so-called IC label, IC tag, or IC card provided in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, or tags on products such as an electronic appliances or on packs. Electronic appliances refer to a liquid crystal display device, an EL display device, a television set (also called a TV set simply, a TV receiver, or a television receiver), a mobile phone, and the like.

Note that in this specification, IC cards are plastic cards embedded with a thin semiconductor integrated circuit (an IC chip) so as to store data. IC cards can be categorized as a "contact type" or a "non-contact type" depending on the method of reading/writing data. A non-contact card has a built-in antenna and can communicate with a terminal by utilizing weak radio waves. In addition, an IC tag refers to a small IC chip used for identification of objects, which stores data such as its own identification code, and is capable of transmitting and receiving data to/from a management system with radio waves. The IC tag has a size of several tens of millimeters and can communicate with a reader with radio waves or electromagnetic waves. An IC tag of the present invention that is applied to a semiconductor device which wirelessly communicates data can be used in various applications such as card-form objects, labels (called IC labels), or certificates.

In this embodiment mode, application examples and examples of products to which they are attached are described with reference to FIGS. 18A to 18E.

Figure 18A:
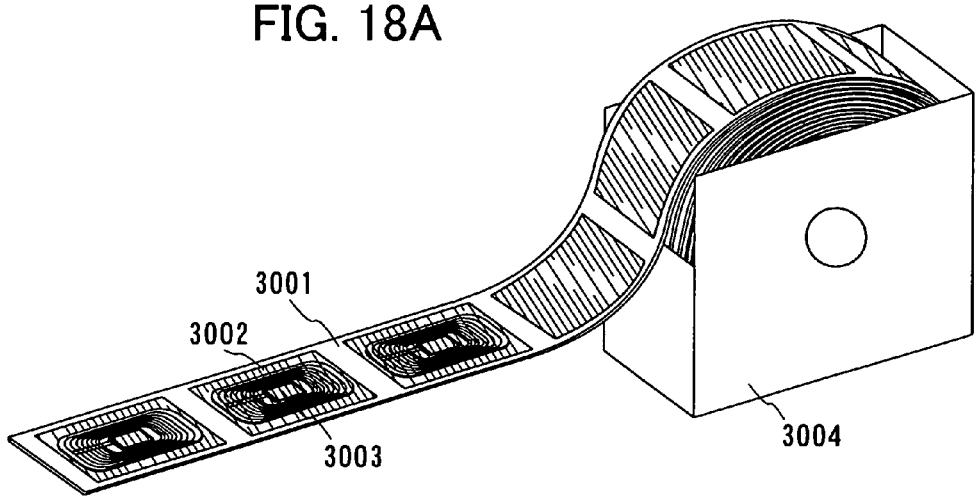
FIGS. 18A to 18E are diagrams each illustrating Embodiment Mode 6.

FIG. 18A shows examples of the states of completed products of a semiconductor device of the present invention. A plurality of IC labels 3003 each incorporating a semiconductor device 3002 is formed on a label board 3001 (separate paper). The IC labels 3003 are put in a box 3004. On the IC label 3003, data on a product or service (for example, a name of the product, a brand, a trademark, a trademark owner, a seller, a manufacturer, and the like) is written. On the other hand, the ID number which is unique to the product (or the kind of the product) is assigned to the incorporated semiconductor device, so that forgery, infringement of intellectual property rights such as a trademark and a patent, and illegality such as unfair competition can be figured out. Further, a lot of data which is too much to be written clearly on a container or a label of the product, for example, production area, selling area, quality, raw material, efficacy, use, quantity, shape, price, production method, directions for use, production time, time of the use, expiration date, instructions of the product, data on the intellectual property of the product, and the like can be inputted in the semiconductor device; therefore, a trader and a consumer can access the data with the use of a simple reader. The producer can also easily carry out rewriting or deleting of the data, while the trader and the consumer are not allowed to carry out rewriting or deleting of the data.

Figure 18B:
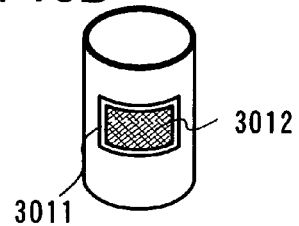

FIG. 18B shows an IC tag 3011 with a label shape, in which a semiconductor device 3012 is incorporated. Mounting the IC tag 3011 on a product allows the product to be managed easily. For example, when the product is stolen, the thief can be figured out quickly by tracing of the pathway of the product. Thus, products which are superior in so-called traceability can be distributed by being provided with the IC tags.

Figure 18C:
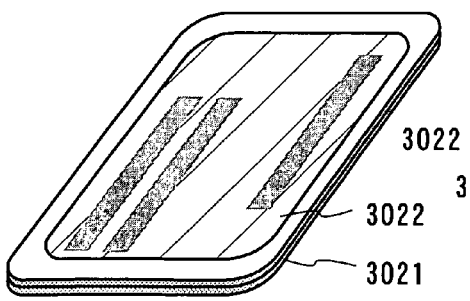

FIG. 18C shows an example of the state of a completed product of an IC card 3021 including a semiconductor device 3022 of the present invention. The IC card 3021 includes all kinds of cards such as a cash card, a credit card, a prepaid card, an electronic ticket, electronic money, a telephone card, and a membership card.

Figure 18D:
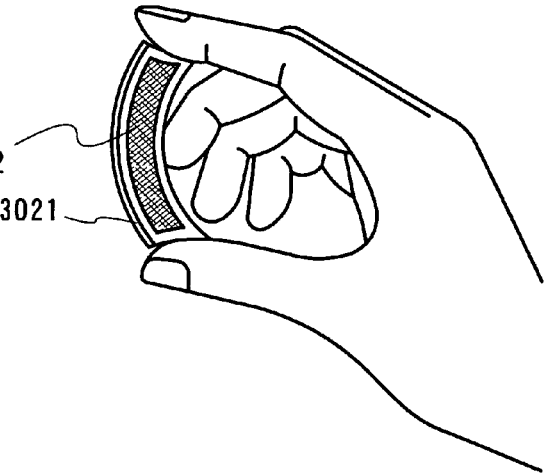

Note that in the case of an IC card shown in FIG. 18C, the IC card can be used even if transformed by being bent as shown in FIG. 18D by using a thin film transistor as a transistor included in the semiconductor device.

Figure 18E:
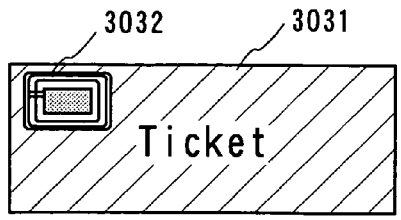

FIG. 18E shows the state of a completed product of a bearer bond 3031. A semiconductor device 3032 is embedded in the bearer bond 3031 and is protected by a resin formed in the periphery thereof. Here, the resin is filled with a filler. The bearer bond 3031 can be formed in the same manner as the IC label, the IC tag, or the IC card of the present invention. Note that the aforementioned bearer bonds include stamps, tickets, admission tickets, merchandise coupons, book coupons, stationery coupons, beer coupons, rice coupons, various gift coupons, various service coupons, and the like. Needless to say, they are not limited thereto. In addition, when the semiconductor device 3032 of the present invention is provided in bills, coins, securities, bearer bonds, documents, or the like, an authentication function can be provided. By utilization of the authentication function, forgery can be prevented.

In addition, although not shown here, the efficiency of a system such as an inspection system can be improved by provision of the semiconductor device of the present invention in, for example, books, packaging containers, storage media, personal belongings, foods, clothing, everyday articles, electronic appliances, or the like. Further, forgery and theft can be prevented by provision of the semiconductor device on vehicles. Individual creatures such as animals can be easily identified by being implanted with the semiconductor device. For example, year of birth, sex, breed, and the like can be easily identified by implantation of the semiconductor device in creatures such as domestic animals.

As described above, anything can be provided with a semiconductor device of the present invention as long as it is an article (including a creature).

Note that this embodiment mode can be implemented in combination with any of technical elements of the other embodiment modes in this specification.

This application is based on Japanese Patent Application serial no. 2007-144372 filed with Japan Patent Office on May 31, 2007, the entire contents of which are hereby incorporated by reference.

What is claimed is:

1. a semiconductor device comprising:
   an antenna;
   a rectifier circuit electrically connected to the antenna;
   a charge accumulation circuit electrically connected to the rectifier circuit; and
   a voltage circuit electrically connected to the charge accumulation circuit, wherein the charge accumulation circuit includes switches and capacitors,
   wherein all of the capacitors in the charge accumulation circuit are configured to be connected in parallel to one another through the switches,
   wherein all of the capacitors in the charge accumulation circuit are directly connected to ground lines,
   wherein each of the switches comprises a transistor and a diode,
   wherein one of source and drain of the transistor is electrically connected to one terminal of the diode, and the other one of source and drain of the transistor is electrically connected to the other terminal of the diode such that when a charge accumulated in a capacitor is determined to reach a predetermined threshold level, the transistor is switched on to allow charge accumulation of the next capacitor,
   wherein accumulation of charges in the capacitors is controlled by the transistor, and
   wherein discharge of charges from the capacitors is controlled by the diode.

2. The semiconductor device according to claim 1, further comprising:
   a logic circuit electrically connected to the voltage circuit;
   a demodulation circuit electrically connected between the logic circuit and the rectifier circuit; and
   a modulation circuit electrically connected between the logic circuit and the antenna.

3. The semiconductor device according to claim 2, wherein the logic circuit includes a CPU, a ROM, a RAM, and a controller for controlling writing or reading of data from or to the CPU, the ROM, and the RAM.

4. the semiconductor device according to claim 1, wherein the transistor included in the semiconductor device is a thin film transistor.

5. An IC label, an IC tag, or an IC card comprising the semiconductor device described in claim 1.

6. a semiconductor device comprising:
   an antenna;
   a rectifier circuit electrically connected to the antenna;
   a charge accumulation circuit electrically connected to the rectifier circuit; and
   a voltage circuit electrically connected to the charge accumulation circuit, wherein the charge accumulation circuit includes switches and capacitors, wherein each of the capacitors in the charge accumulation circuit has a first electrode and a second electrode, wherein each of the first electrode of the capacitors in the charge accumulation circuit is connectable to each other via one of the switches, wherein all of the capacitors in the charge accumulation circuit are directly connected to ground lines via the second electrodes,
   wherein each of the switches comprises a transistor and a diode,
   wherein one of source and drain of the transistor is electrically connected to one terminal of the diode, and the other one of source and drain of the transistor is electrically connected to the other terminal of the diode such that when a charge accumulated in a capacitor is determined to reach a predetermined threshold level, the transistor is switched on to allow charge accumulation of the next capacitor,
   wherein accumulation of charges in the capacitors is controlled by the transistor, and
   wherein discharge of charges from the capacitors is controlled by the diode.

7. The semiconductor device according to claim 6, further comprising:
   a logic circuit electrically connected to the voltage circuit;
   a demodulation circuit electrically connected between the logic circuit and the rectifier circuit; and
   a modulation circuit electrically connected between the logic circuit and the antenna.

8. The semiconductor device according to claim 7, wherein the logic circuit includes a CPU, a ROM, a RAM, and a controller for controlling writing or reading of data from or to the CPU, the ROM, and the RAM.

9. the semiconductor device according to claim 6, wherein the transistor included in the semiconductor device is a thin film transistor.

10. An IC label, an IC tag, or an IC card comprising the semiconductor device described in claim 6.

11. a semiconductor device comprising:
    an antenna;
    a rectifier circuit electrically connected to the antenna;
    a charge accumulation circuit electrically connected to the rectifier circuit; and
    a voltage circuit electrically connected to the charge accumulation circuit, wherein the charge accumulation circuit includes switches, capacitors, and a charge accumulation control circuit, wherein all of the capacitors in the charge accumulation circuit are configured to be connected in parallel to one another through the switches,
    wherein the charge accumulation control circuit controls on or off of the switches in accordance with a voltage to be applied to the voltage circuit,
    wherein all of the capacitors in the charge accumulation circuit are directly connected to ground lines,
    wherein each of the switches comprises a transistor and a diode,
    wherein one of source and drain of the transistor is electrically connected to one terminal of the diode, and the other one of source and drain of the transistor is electrically connected to the other terminal of the diode such that when a charge accumulated in a capacitor is determined to reach a predetermined threshold level, the transistor is switched on to allow charge accumulation of the next capacitor;
    wherein accumulation of charges in the capacitors is controlled by the transistor, and
    wherein discharge of charges from the capacitors is controlled by the diode.

12. The semiconductor device according to claim 11, further comprising:
    a logic circuit electrically connected to the voltage circuit;
    a demodulation circuit electrically connected between the logic circuit and the rectifier circuit; and a modulation circuit electrically connected between the logic circuit and the antenna.

13. The semiconductor device according to claim 12, wherein the logic circuit includes a CPU, a ROM, a RAM, and a controller for controlling writing or reading of data from or to the CPU, the ROM, and the RAM.

14. the semiconductor device according to claim 11, wherein the transistor included in the semiconductor device is a thin film transistor.

15. An IC label, an IC tag, or an IC card comprising the semiconductor device described in claim 11.

16. a semiconductor device comprising:
an antenna;
a rectifier circuit electrically connected to the antenna;
a charge accumulation circuit electrically connected to the rectifier circuit; and
a voltage circuit electrically connected to the charge accumulation circuit, wherein the charge accumulation circuit includes switches and capacitors, and a charge accumulation control circuit, wherein each of the capacitors in the charge accumulation circuit has a first electrode and a second electrode, wherein each of the first electrode of the capacitors in the charge accumulation circuit is connectable to each other via one of the switches,
wherein the charge accumulation control circuit controls on or off of the switches in accordance with a voltage to be applied to the voltage circuit,
wherein all of the capacitors in the charge accumulation circuit are directly connected to ground lines via the second electrodes,
wherein each of the switches comprises a transistor and a diode, and wherein one of source and drain of the transistor is electrically connected to one terminal of the diode, and the other one of source and drain of the transistor is electrically connected to the other terminal of the diode such that when a charge accumulated in a capacitor is determined to reach a predetermined threshold level, the transistor is switched on to allow charge accumulation of the next capacitor;
wherein accumulation of charges in the capacitors is controlled by the transistor, and
wherein discharge of charges from the capacitors is controlled by the diode.

17. The semiconductor device according to claim 16, further comprising:
a logic circuit electrically connected to the voltage circuit;
a demodulation circuit electrically connected between the logic circuit and the rectifier circuit; and
a modulation circuit electrically connected between the logic circuit and the antenna.

18. The semiconductor device according to claim 17, wherein the logic circuit includes a CPU, a ROM, a RAM, and a controller for controlling writing or reading of data from or to the CPU, the ROM, and the RAM.

19. the semiconductor device according to claim 16, wherein the transistor included in the semiconductor device is a thin film transistor.

20. An IC label, an IC tag, or an IC card comprising the semiconductor device described in claim 16.

* * * * *